(12) United States Patent
Kawano

(10) Patent No.: US 6,625,107 B2
(45) Date of Patent: Sep. 23, 2003

(54) MAGNETO-OPTICAL RECORDING MEDIUM HAVING LUBRICATION ON BOTH SIDES

(75) Inventor: Hiroyasu Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/359,022

(22) Filed: Jul. 22, 1999

(65) Prior Publication Data
US 2002/0031054 A1 Mar. 14, 2002

(30) Foreign Application Priority Data
Sep. 24, 1998 (JP) .......................... 10-270331

(51) Int. Cl.⁷ .............. G11B 7/24; B32B 3/02
(52) U.S. Cl. ............ 369/275.5; 428/64.1; 369/283; 369/13.35
(58) Field of Search .............. 369/13, 275.2, 369/275.3, 283, 286, 288, 13.13, 13.35, 275.5, 275.1; 360/114; 428/64.1, 64.4, 426, 64.5, 694 DE; 425/385, 342

(56) References Cited

U.S. PATENT DOCUMENTS

| | | | |
|---|---|---|---|
| 5,353,278 A | * 10/1994 | Murakami et al. | 369/290 |
| 5,453,884 A | * 9/1995 | Ohta et al. | 369/13 |
| 5,568,466 A | * 10/1996 | Komaki et al. | 369/275.2 |
| 5,580,633 A | * 12/1996 | Kuwahara et al. | 428/64.3 |
| 5,604,005 A | * 2/1997 | Endo et al. | 428/64.3 |
| 6,106,919 A | * 8/2000 | Lee et al. | 428/64.1 |
| 6,127,017 A | * 10/2000 | Hirata et al. | 428/64.1 |
| 6,160,769 A | * 12/2000 | Ohnuki et al. | 369/13 |
| 6,214,429 B1 | * 4/2001 | Zou et al. | 428/64.1 |
| 6,333,089 B1 | * 12/2001 | Hirata et al. | 428/64.1 |

FOREIGN PATENT DOCUMENTS

| | | |
|---|---|---|
| JP | 4168636 | 6/1992 |
| JP | 5307754 | 11/1993 |
| JP | 6176353 | 6/1994 |
| JP | 7254180 | 10/1995 |
| JP | 7334865 | 12/1995 |

* cited by examiner

Primary Examiner—Ali Neyzari
(74) Attorney, Agent, or Firm—Greer, Burns & Crain Ltd.

(57) ABSTRACT

A magneto-optical recording medium which is capable of improving the floating stability and the travelling stability of an optical head of a slider type, by forming a lubricating protective layer having a transparent/translucent property on a surface on which the optical head is placed.

18 Claims, 16 Drawing Sheets

MAGNETO-OPTICAL RECORDING MEDIUM HAVING LUBRICATION ON BOTH SIDES

BACKGROUND OF THE INVENTION

The present invention relates to a magneto-optical recording medium which can carry out magneto-optical recording and/or reproducing, and to an optical head device in which an objective lens is installed in a slider.

Optical disks, such as phase-change-type optical disks and magneto-optical disks, that are rewritable recording media with a large capacity have received much attention as a recording media for computers. The phase-change-type optical disks, typically including DVD-RAMs, and the magneto-optical disks, typically including AS-MOs, have been under development in order to achieve higher density recording with a larger capacity.

With respect to recording systems for magneto-optical disks, there have been known a light-intensity-modulation recording system in which the intensity of a laser light beam released from a laser light source such as a laser diode is changed and a magnetic-field-modulation recording system in which the intensity of a magnetic field generated by a magnetic head is changed; and either of these is used to carry out information recording. In the magnetic-field-modulation recording system, a floating-slider-type magnetic head or a sliding-slider-type magnetic head, which is used for recording and reproducing a magnetic disk, is also used for a magneto-optical disk. The magneto-optical disk has a layer construction including at least a substrate and a recording layer, and, for example, the floating-slider-type magnetic head is placed on a side closer to the recording layer. Upon recording and reproducing that requires a reproducing magnetic field, the slider is allowed to float above a disk face in the proximity thereof by an air flow that is generated in response to rotation of the magneto-optical disk, and after the slider has been shifted to a desired position above the magneto-optical disk, a magnetic field is applied thereto.

In the case of the above-mentioned magnetic head of a floating-slider type, the slider is maintained in a floating state while the magneto-optical disk is in rotation. However, even in such a floating state, when dusts, stains, etc. adhere to the disk surface, or when the disk has a warp, the stable floating state of the slider tends to deteriorate, with the result that the slider collides with the disk surface, causing damages to the disk surface. Moreover, the collision or crash of the magnetic head onto the disk surface might further damage a supporting mechanism for the magnetic head. Also in the case of the magnetic head of a sliding-slider type, when a sliding frictional force between the slider and the disk is not sufficient, the slider tends to jump, causing the possibility of scratches on the disk surface. Moreover, there is a possibility that a stable sliding operation with a constant speed is not available.

In order to avoid these problems, Japanese Patent Applications Laid-Open Nos. 6-176353 (1994), 7-254180 (1995) and 7-334865 (1995) have proposed magneto-optical recording media that are provided with a lubricating protective layer on the surface of a recording layer, that is, on the surface opposite to the substrate. The application of the lubricating protective layer minimizes a frictional force between the slider and the disk surface, thereby making it possible to prevent scratching even in the event of contact and collision and consequently to achieve a stable operation.

In recent years, a technique has been reported in which light-intensity-modulation recording or magnetic-field-modulation recording is carried out on a magneto-optical disk by using an optical head of a floating-slider type or a sliding-slider type. With respect to such an optical head of the slider type, various constructions have been proposed; and for example, some of them have a construction in which: an optical lens is installed on a slider, and a laser light beam, which is released toward a prism that operates in a manner so as to follow the slider, is allowed to pass through the optical lens and applied onto the disk surface.

In the same manner as the aforementioned magnetic head, the optical head of the slider type having the above-mentioned construction is susceptible to scratches on the disk surface due to degradation of the floating stability caused by dusts, stains, a warp in the disk, etc., when it is allowed to float above the disk surface by an air flow. Moreover, it is also susceptible to scratches on the disk surface due to degradation of the travelling stability caused by dusts, stains, a warp in the disk, etc., when it is allowed to slide on the disk surface. Furthermore, the supporting mechanism of the optical head might be damaged due to contact, collisions, etc. of the head onto the disk surface.

Generally, upon recording and/or reproducing of a magneto-optical disk, a laser light beam is made incident on a side closer to the substrate of the disk. Therefore, the optical head of the slider type is placed on the substrate. In the magneto-optical disks disclosed by the aforementioned Japanese Patent Applications Laid-Open Nos. 6-176353 (1994), 7-254180 (1995) and 7-334865 (1995), since the lubricating protective layer is formed on the surface of the recording layer opposite to the substrate, the resulting problem is that it is not possible to prevent scratches on the disk surface caused by the optical head of the slider type. Moreover, since the optical head requires a positional controlling operation with higher precision and has quicker movements as compared with the magnetic head, the resulting problem is that scratches on the disk surface and damages to the optical head tend to occur.

BRIEF SUMMARY OF THE INVENTION

The present invention has been devised to solve the above-mentioned problems, and its objective is to provide a magneto-optical recording medium which can prevent scratches on the disk surface caused by a slider-type optical head, and improve the floating stability and travelling stability of the optical head.

The magneto-optical medium of the present invention is characterized by comprising: a substrate; a recording layer, formed on the substrate, for recording information; a first lubricating protective layer formed on the recording layer; and a second lubricating protective layer having a transparent/translucent property, being formed on a face of the substrate opposite to the recording layer. In the present invention, the transparent/translucent lubricating protective layer is placed on the same side that the optical head is located on in a magneto-optical recording medium of a type in which a light beam is projected from a side closer to the substrate. Therefore, upon carrying out recording/reproducing of information on the magneto-optical recording medium by using an optical head of a slider type such as a floating-type slider or a sliding-type slider, when the slider of the optical head is allowed to float above the lubricating protective layer in the proximity thereof, superior floating stability is achieved, and when it is allowed to slide on the lubricating protective layer, the sliding frictional force is minimized so that higher travelling stability is achieved. Moreover, since the lubricating protective layer minimizes the impact at the time when the slider contacts or collides with it, it is possible to prevent scratches on the disk surface.

The magneto-optical recording medium of the present invention is characterized by comprising: a substrate; a recording layer, formed on the substrate, for recording information; and a lubricating protective layer having a transparent/translucent property, being formed on the recording layer.

In the present invention, the transparent/translucent lubricating protective layer is placed on the same side that the optical head is located on in a magneto-optical recording medium of a type in which a light beam is made incident on a side closer to the recording layer. Therefore, when the slider of the optical head is allowed to float above the lubricating protective layer in the proximity thereof, superior floating stability is achieved, and when it is allowed to slide on the lubricating protective layer, the sliding frictional force is minimized so that higher travelling stability is achieved. Moreover, since the lubricating protective layer minimizes the impact at the time when the slider contacts or collides with it, it is possible to prevent scratches on the disk surface.

The magneto-optical recording medium of the present invention is characterized in that the transparent/translucent lubricating protective layer is a mixed lubricating layer which is made by mixing at least a transparent/translucent lubricant with a transparent/translucent resin.

In the present invention, a resin layer, which has been made by mixing at least a transparent/translucent lubricant with a transparent/translucent resin serving as a base material at a predetermined ratio, is placed on the same side that the optical head of a magneto-optical recording medium is located on. Therefore, it is possible to maintain superior floating stability and travelling stability in the optical head.

The magneto-optical recording medium of the present invention is characterized in that the transparent/translucent lubricating protective layer is provided with a resin layer made of a transparent/translucent resin and a lubricant layer that is made of a transparent/translucent lubricant, and formed as an outermost layer.

In the present invention, the lubricating protective layer is placed on the same side that the optical head of the magneto-optical recording medium is located on. Therefore, the substrate or the recording layer is protected by the resin layer so that the floating stability and the travelling stability of the optical head are improved by the lubricant layer.

The magneto-optical recording medium of the present invention is characterized in that the transparent/translucent lubricating protective layer is provided with a mixed lubricating layer made by mixing at least a transparent/translucent lubricant with a transparent/translucent resin, and a lubricant layer that is made of a transparent/translucent lubricant, and formed as an outermost layer.

Therefore, since the mixed lubricating layer and the lubricant layer are stacked, it is possible to further improve the floating stability and the travelling stability of the optical head.

The magneto-optical recording medium of the present invention is characterized in that at least one portion of the substrate is made of glass, and in that the second lubricating protective layer is formed by allowing a transparent/translucent lubricant to contact the glass of the substrate.

In the present invention, the transparent/translucent lubricant is directly applied to the glass face of the substrate. Therefore, the beam irradiation face can be protected without forming a resin layer thereon, and also to improve the floating stability and the travelling stability of the slider.

The magneto-optical recording medium of the present invention is characterized in that a buffering layer that is made of a transparent/translucent dielectric is further formed between the substrate and the second lubricating protective layer.

Therefore, since the buffering layer, for example, made of an oxide or a nitride, is formed, it becomes possible to reduce the possibility of tilting, warping, etc. of the substrate due to thermal expansion or moisture absorption of the substrate. Moreover, the second lubricating protective layer makes it possible to improve the floating stability and the travelling stability of the slider.

The magneto-optical recording medium of the present invention is characterized in that the transparent/translucent lubricant accounts for 5% by weight to 15% by weight of the lubricating protective layer.

In the present invention, in the case when the transparent/translucent lubricant accounts for 5% by weight to 15% by weight, it is possible to provide better floating stability and travelling stability in the slider. The transparent/translucent lubricant less than 5% by weight causes a reduction in the lubricating property, and that exceeding 15% by weight makes the adhering property to the slider greater, resulting in degradation in the floating stability and the travelling stability of the slider in comparison.

The magneto-optical recording medium of the present invention is characterized in that the above-mentioned transparent/translucent lubricant uses oil at least one selected from the group consisting of fluorine-containing oil, silicon oil and hydrocarbon oil.

In the present invention, oil that is in a liquid state at room temperature (liquid lubricant) and has a superior affinity with a parent-material resin or a base material, such as fluorine-containing oil, silicon oil and hydrocarbon oil that are, for example, ether-modified, alkyl-modified, ester-modified, alcohol-modified or carboxyl-modified, is used as the transparent/translucent lubricant. These materials have a superior chemical adsorptive property to a dielectric layer made of an oxide or a nitride, acrylic resins or glass; therefore, by allowing these to adhere to a substrate made of glass or an acrylic resin, or to a dielectric layer, it becomes possible to extremely improve the lubricant durability of the lubricating protective layer.

Moreover, another objective of the present invention is to provide an optical head device which can improve the floating stability and the travelling stability of a slider-type optical head by forming the slider by using a liquid crystal polymer.

The optical head device of the present invention is characterized by comprising: a slider being allowed to slide or float on or over the surface of a magneto-optical recording medium, the slider being formed by a polymer material containing a liquid crystal polymer; and a light source that emits a light beam onto the magneto-optical recording medium through an objective lens installed in the slider.

In the present invention, the slider, which is injection-molded by using a liquid crystal polymer, is formed into a desired shape with high dimensional precision; therefore, it is possible to provide higher floating stability and travelling stability in the slider. Moreover, as compared with sliders made of ceramics that are used in magnetic disks, this slider is less susceptible to scratches on the disk surface.

The above and further objects and features of the invention will more fully be apparent from the following detailed description with accompanying drawings.

DETAILED DESCRIPTION OF THE INVENTION

Referring to Figures, the following description will discuss embodiments of the present invention in detail.

Embodiment 1

Figure 1:
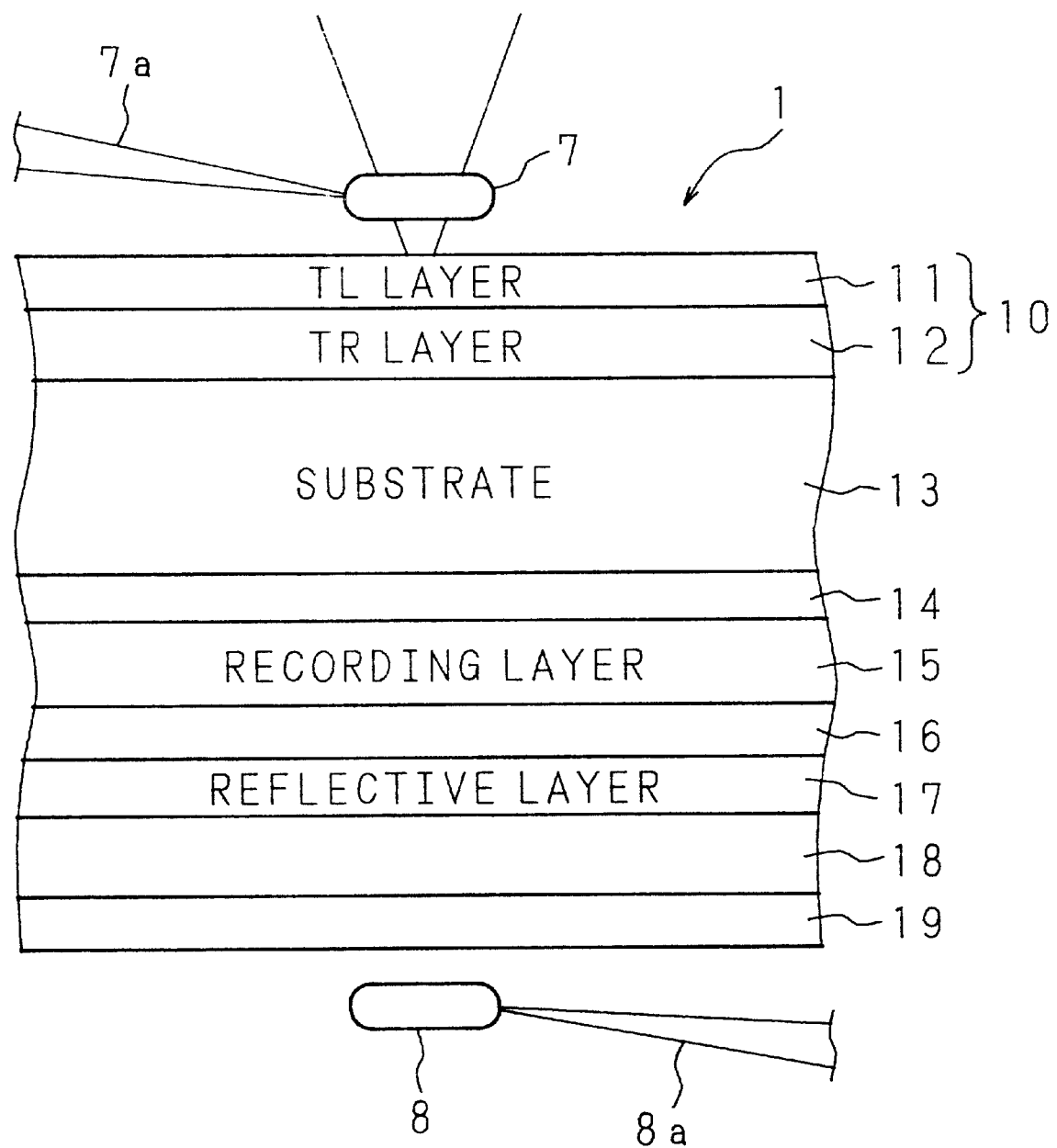
FIG. 1 is a cross-sectional view that shows a film construction of a magneto-optical disk in accordance with embodiment 1 of the present invention.

FIG. 1 is a cross-sectional view that shows a film construction of a magneto-optical disk in accordance with embodiment 1 of the present invention. In the magneto-optical disk 1 of the present embodiment, on a substrate 13 made of a polycarbonate resin are stacked a first dielectric protective layer 14 made of silicon nitride, a recording layer 15 made of GdFeCo or TbFeCo, a second dielectric protective layer 16 made of silicon nitride, a reflective layer 17 made of aluminum, a resin layer 18 made of acrylic resin and a lubricant layer 19 made from fluorine-containing oil in this order. Moreover, the substrate 13 is provided with a lubricating protective layer 10 that features the present invention on its side opposite to the recording layer 15. The lubricating protective layer 10 is constituted by a transparent/translucent resin layer 12 (is showed to as TR layer in figures) made of a transparent/translucent acrylic resin and a transparent/translucent lubricant layer 11 (is showed to as TL layer in figures) made of fluorine-containing oil, and the transparent/translucent lubricant layer 11 is formed as the outermost layer of the magneto-optical disk 1.

As illustrated in FIG. 1, when the magneto-optical disk 1 having the above-mentioned construction is loaded into a magneto-optical recording-reproduction apparatus, the optical head 7 is located on a side closer to the substrate 13 of the magneto-optical disk 1, and the magnetic head 8 is located on a side closer to the recording layer 15. Each of the optical head 7 and the magnetic head 8 is supported by an arm 7a or 8a that serves as a suspension; thus, they have a floating-slider-type construction. Each of the sliders is made of ceramics such as calcium titanate and aluminum oxide-titanium carbide, and the optical head 7 has a slider to which an optical lens is attached.

The optical head 7 and the magnetic head 8 are shifted to desired positions on the magneto-optical disk, and a laser light beam from the optical head 7 is made incident on the transparent/translucent lubricant layer 11, that is, on a side closer to the substrate 13. Simultaneously, a magnetic field is applied from the magnetic head 8 onto the lubricant layer 19, that is, onto a face opposite to the substrate 13 so as to record information on the magneto-optical disk 1. Here, in the case of a magneto-optical disk of a type that requires a reproducing magnetic field, upon reproduction, a magnetic field is applied from the magnetic head 8 in the same manner, while a laser light beam is emitted from the optical head 7. In the case of a magneto-optical disk requiring no reproducing magnetic field, no magnetic field is applied and a laser light beam is emitted from the optical head 7.

The magneto-optical disk 1 having the above-mentioned film construction is manufactured as follows: The first dielectric protective layer 14, the recording layer 15, the second dielectric protective layer 16 and the reflective layer 17 are successively stacked on the substrate 13 by sputtering. Then, a transparent/translucent acrylic resin is applied to the surface of each of the reflective layer 17 and the substrate 13 and then, ultraviolet-set so that the resin layer 18 and the transparent/translucent resin layer 12 are formed. Next, fluorine-containing oil is applied to the surface of each of the resin layer 18 and the transparent/translucent resin layer 12 by spin coating or spray coating, and then dried so that the lubricant layer 19 and the transparent/translucent lubricant layer 11 are formed.

Here, the substrate 13 may be made of polyolefin resin, glass or 2P glass, and the first and second dielectric protective layers 14 and 16 may be made of silicon oxide, aluminum nitride or aluminum oxide. Moreover, the reflective layer 17 may be made of an aluminum alloy or gold, and the recording layer 15 is a magnetic film that enables magneto-optical recording.

Furthermore, the transparent/translucent lubricant layer 11 and the lubricant layer 19 may be made of transparent/translucent silicone oil or transparent/translucent hydrocarbon oil. In particular, fluorine-containing oil, silicon oil or hydrocarbon oil that is alcohol-modified, ester-modified, alkyl-modified, ether-modified or carboxyl-modified, has a superior chemical adsorptive property to a dielectric layer made of an oxide or a nitride, acrylic resins or glass. Therefore, the application of such oil (liquid lubricant) onto the transparent/translucent resin layer 12 makes it possible to extremely improve the lubricant durability of the lubricating protective layer 10.

Moreover, the transparent/translucent lubricant layer 11 and the transparent/translucent resin layer 12 at least require to possess a transparent/translucent property to the laser light beam that is used for information recording/reproducing on/from the magneto-optical disk 1; in contrast, the resin layer 18 and the lubricant layer 19 on a side closer to the reflective layer 17 do not necessarily require to possess a transparent/translucent property. The resin layer 18 and the lubricant layer 19 serve as lubricating protective layers with respect to the magnetic head 8.

Figure 2:
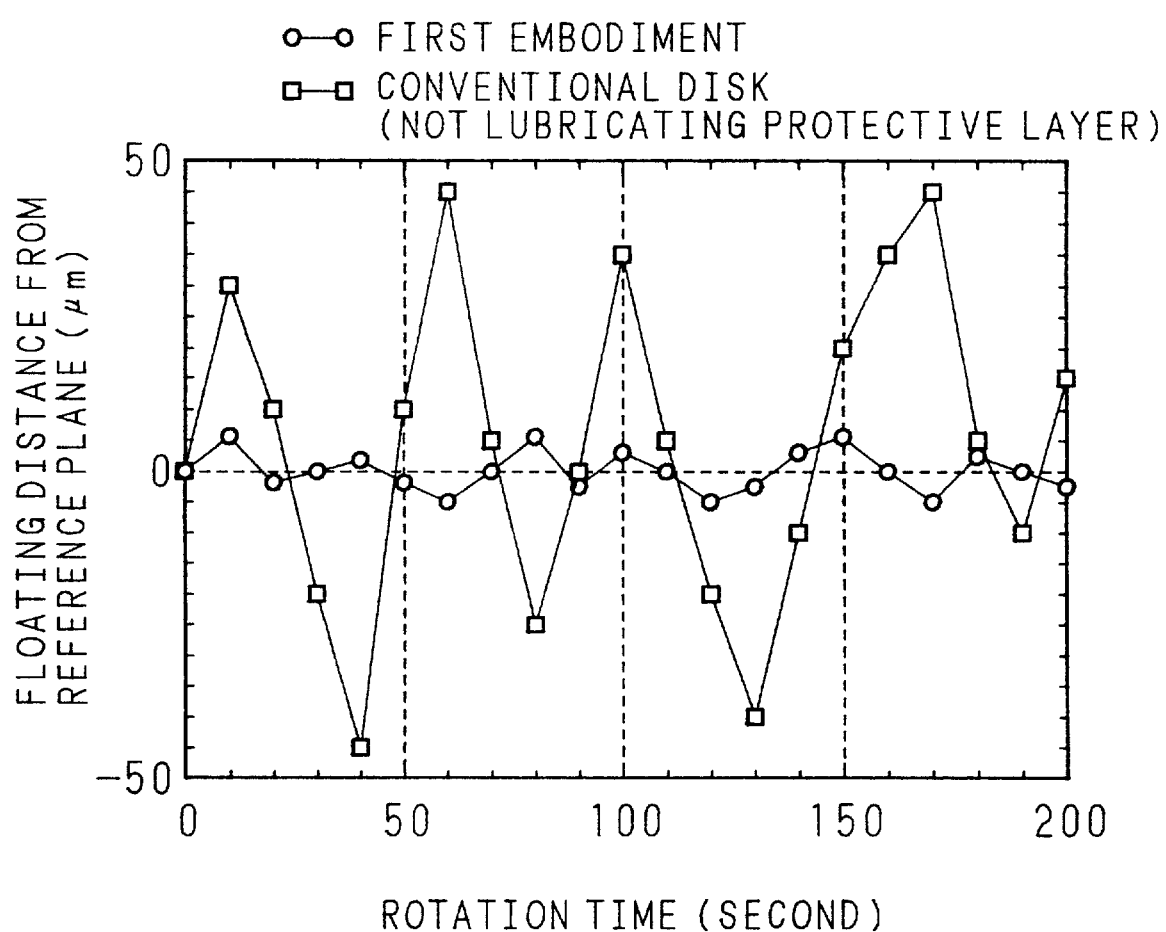
FIG. 2 is a graph that shows the floating stability of an optical head with respect to the magneto-optical disk of embodiment 1.

With respect to the above-mentioned magneto-optical disk 1, the floating distance of the optical head 7 in relation to the disk rotation time was measured. The results of the measurements are shown in FIG. 2. The axis of abscissa of FIG. 2 represents the rotation time of the disk, and the axis of ordinate represents the floating distance of the optical head from a reference plane. The reference plane was defined as a position having a predetermined distance from the surface of the transparent/translucent lubricant layer 11 of the magneto-optical disk 1. The same measurements were carried out on a conventional disk that has no lubricating protective layer formed on the substrate side, and the results are shown in the graph. In the graph, "○" represents the results of the embodiment 1 and "□" represents the results of the conventional disk. As clearly shown by the graph, variations in the floating distance of the magneto-optical disk 1 are smaller; therefore, it is proved that the magneto-optical disk 1 has better floating stability of the optical head 7 as compared with the conventional disk.

Figure 3:
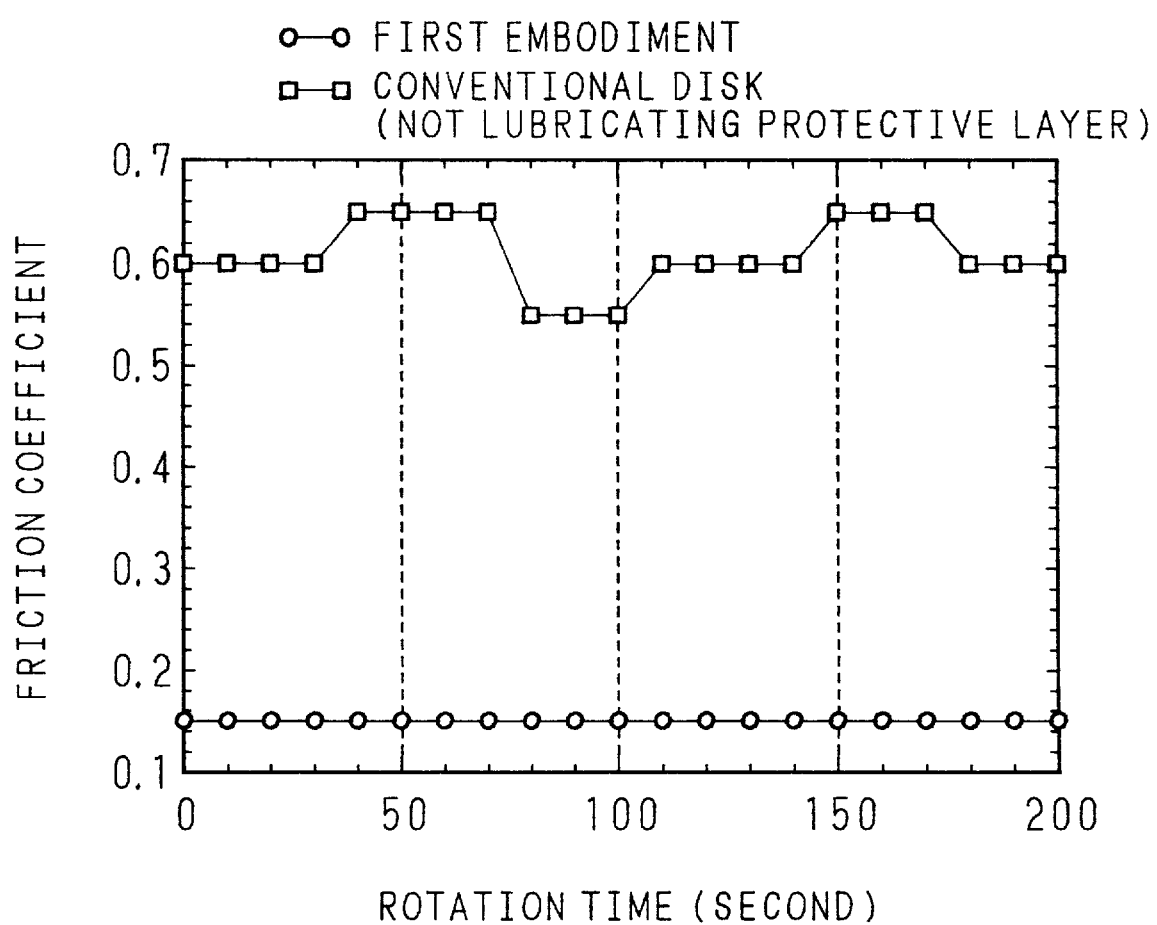
FIG. 3 is a graph that shows the frictional force of the optical head with respect to the magneto-optical disk of embodiment 1.

Moreover, with respect to the magneto-optical disk 1, the sliding frictional force between the optical head 7 and the transparent/translucent lubricant layer 11 at the time of low-speed rotation was measured. The results are shown in FIG. 3. The axis of abscissa of FIG. 3 represents the rotation time of the disk, and the axis of ordinate represents the friction coefficient between the optical head 7 and the transparent/translucent lubricant layer 11. The same measurements were carried out on a conventional disk that has no lubricating protective layer formed on the substrate, and the results are shown in the graph. In the graph, "○" represents the results of the embodiment 1, and "□" represents the results of the conventional disk. As clearly shown by the graph, the magneto-optical disk 1 has a smaller friction coefficient; therefore, it is proved that the magneto-optical disk 1 has better travelling stability in the optical head 7 as compared with the conventional disk.

The above-mentioned results show that in the magneto-optical disk 1, the application of the lubricating protective layer 10, constituted by the transparent/translucent resin layer 12 and the transparent/translucent lubricant layer 11, on a side closer to the substrate 13 makes it possible to improve the floating stability and the travelling stability of the optical head 7, and consequently to prevent scratches on the disk surface. Since the resin layer 18 and the lubricant layer 19 are formed on the surface facing the magnetic head 8 in the magneto-optical disk 1, it is also becomes possible to provide high floating stability and travelling stability to the magnetic head 8.

Embodiment 2

Figure 4:
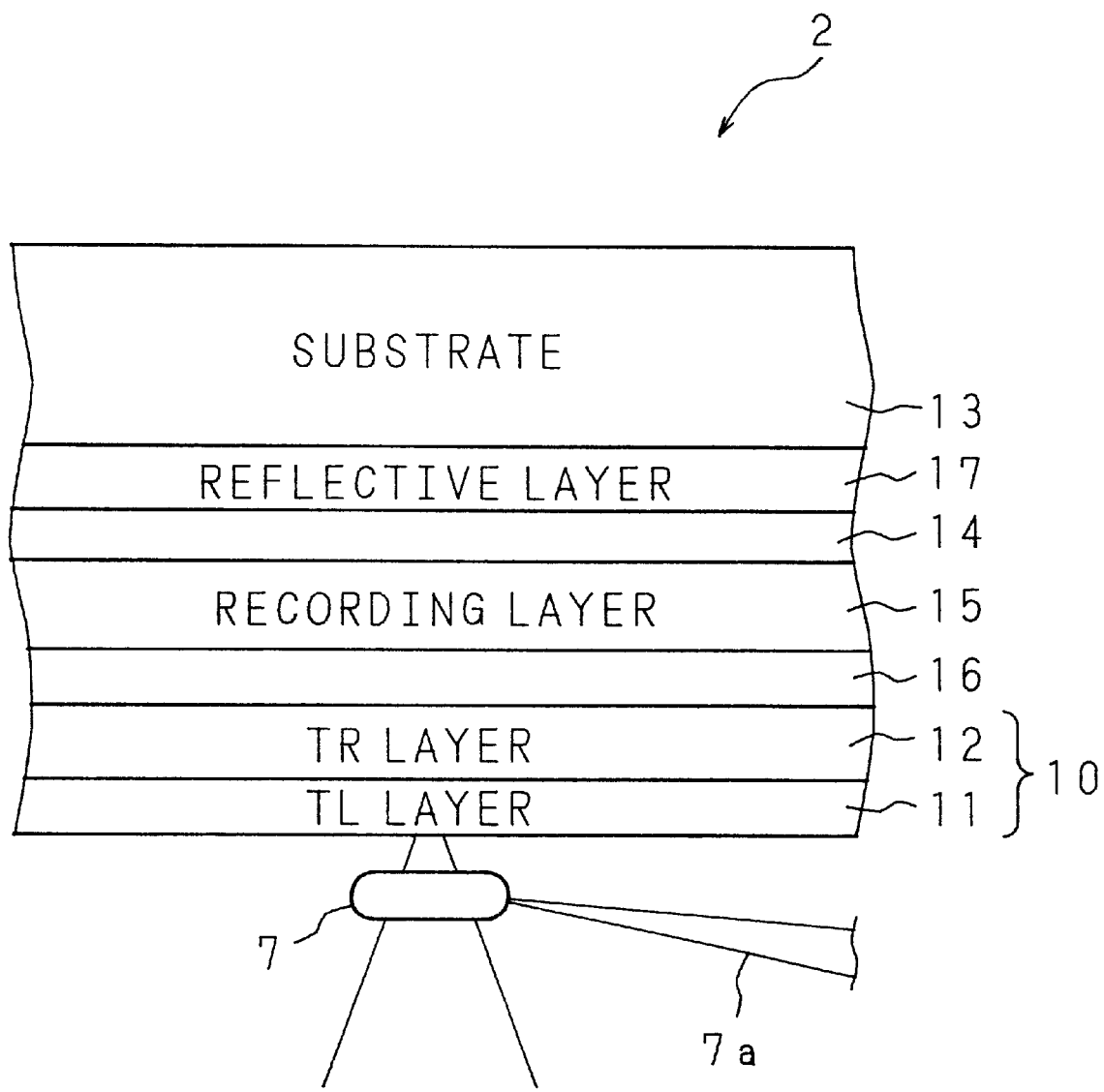
FIG. 4 is a cross-sectional view that shows a film construction of a magneto-optical disk in accordance with embodiment 2 of the present invention.

FIG. 4 is a cross-sectional view that shows a film construction of a magneto-optical disk in accordance with embodiment 2. In this magneto-optical disk 2, a laser light beam is made incident on a side closer to the recording layer, that is on a face opposite to the substrate 13, and a magnetic field is also applied. As illustrated in FIG. 4, on a substrate 13 are stacked a reflective layer 17, a first dielectric protective layer 14, a recording layer 15 and a second dielectric protective layer 16, and on the second dielectric protective layer 16 is stacked a lubricating protective layer 10. The lubricating protective layer 10 is constituted by a transparent/translucent resin layer 12 and a transparent/translucent lubricant layer 11, and the transparent/translucent lubricant layer 11 is formed as the outermost layer of the magneto-optical disk 2. The other constructions, the materials of the respective layers and the manufacturing method are the same as those of the above-mentioned embodiment 1; therefore, the description thereof is omitted.

With respect to the magneto-optical disk 2 having the above-mentioned construction, the same measurements as described above were carried out so as to evaluate the floating stability and the travelling stability of the optical head 7, and the same results as embodiment 1 were obtained. Therefore, it is proved that the magneto-optical disk 2 of embodiment 2, in which the lubricating protective layer 10, constituted by the transparent/translucent resin layer 12 and the transparent/translucent lubricant layer 11, is formed on a side closer to the recording layer 15 that is the laser-light-beam incident side, makes it possible to improve the floating stability and the travelling stability of the optical head 7, and consequently to provide the same effects as embodiment 1.

In embodiment 1 and embodiment 2, explanations were given by exemplifying a case in which the lubricating protective layer is constituted by two layers, that is, the transparent/translucent resin layer and the transparent/translucent lubricant layer; however, the present invention is not intended to be limited thereby. The following description will discuss a magneto-optical disk in which a transparent/translucent resin layer having a lubricant is formed as a lubricating protective layer.

Embodiment 3

Figure 5:
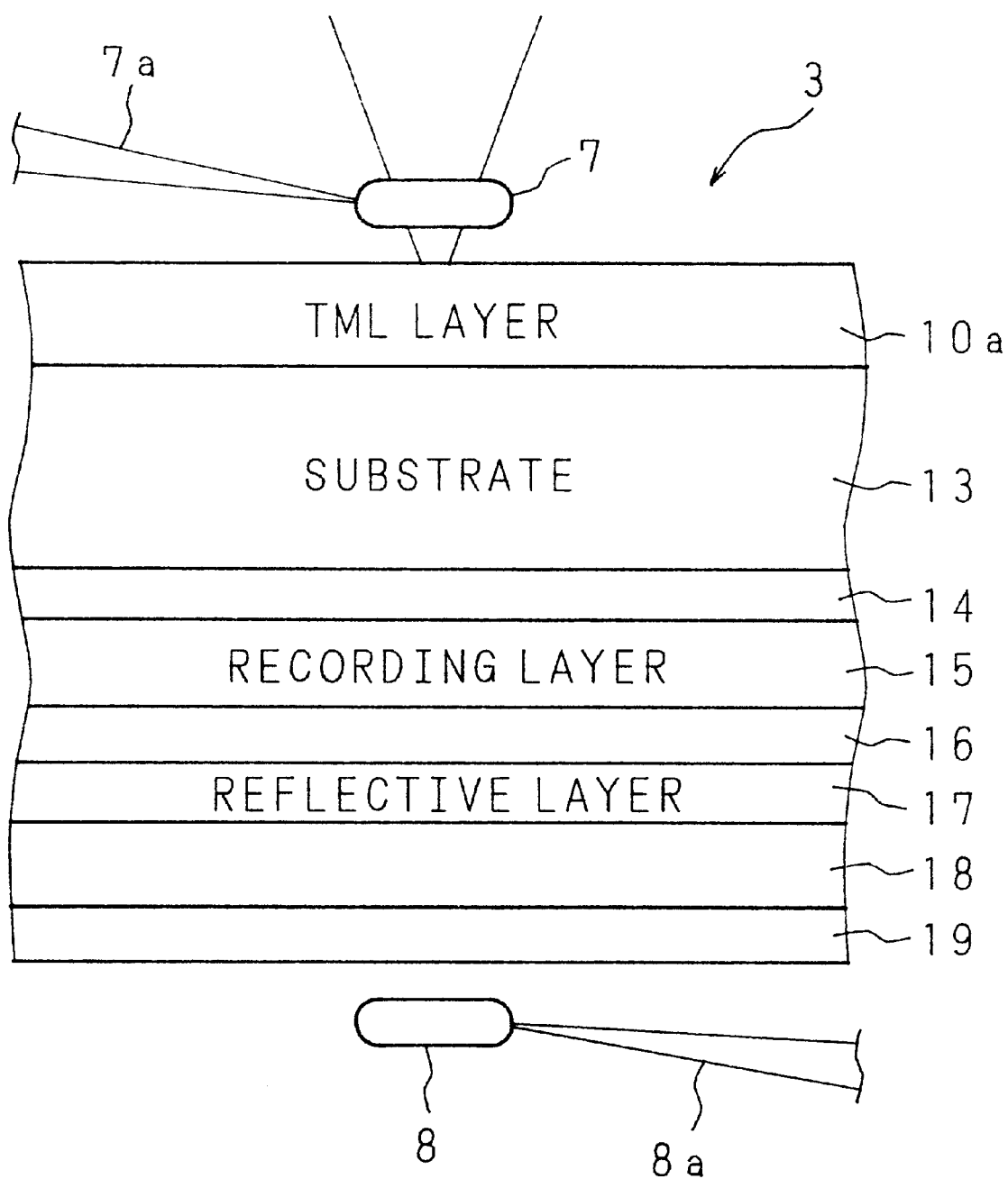
FIG. 5 is a cross-sectional view that shows a film construction of a magneto-optical disk in accordance with embodiment 3 of the present invention.

FIG. 5 is a cross-sectional view that shows a film construction of a magneto-optical disk in accordance with embodiment 3. In this magneto-optical disk 3, a laser light beam is made incident on a side closer to the substrate, and a magnetic field is applied on a side closer to the recording layer, that is, on a face opposite to the substrate 13. As illustrated in FIG. 5, a transparent/translucent mixed lubricating layer 10a is placed on the surface of the substrate 13 opposite to the recording layer 15. The transparent/translucent mixed lubricating layer 10a has a transparent/translucent acrylic resin as a parent material resin. To this is mixed transparent/translucent fluorine-containing oil at a predetermined ratio, and this is applied onto the substrate 13, and then ultraviolet-set; thus, the transparent/translucent mixed lubricating layer 10a is formed. The other constructions, the materials of the respective layers and the manufacturing method are the same as those described in embodiment 1; therefore, the description thereof is omitted. Here, the transparent/translucent mixed lubricating layer 10a may be formed by mixing transparent/translucent silicone oil or transparent/translucent hydrocarbon oil with a photo-curing resin such as an acrylic resin.

Several of the above-mentioned magneto-optical disks 3 were manufactured by varying the mixing ratio between the acrylic resin and the fluorine-containing oil of the transparent/translucent mixed lubricating layer 10a. The lubricating property and the non-adhering property to the slider were examined with respect to each of the disks. The lubricating property was evaluated by using a method in which the slider was allowed to slide by rotating the magneto-optical disk 3 predetermined times at a low rotation speed so as not to allow the slider to float in order to measure changes in the slider's distortion due to the sliding frictional resistance against the transparent/translucent mixed lubricating layer 10a. Moreover, the non-adhering property of the slider to the disk surface was evaluated by slowly raising the slider after sliding rotation and observing up-and-down vibrations of the slider at the time of departing from the disk surface. The results of these tests are shown in TABLE 1. In the Table, when the change in the distortion was not more than 2 nm, the lubricating property was evaluated as "○", when in the range of 2 nm to 4 nm, it was evaluated as "Δ", and when not less than 4 nm, it was evaluated as "X". Moreover, when no up-and-down vibration occurred, the non-adhering property of the slider to the disk surface was evaluated as "○", when up-and-down vibrations occurred slightly, it was evaluated as "Δ", and when up-and-down vibrations occurred greatly, it was evaluated as "X".

As clearly shown by TABLE 1, it is preferable for the transparent/translucent mixed lubricating layer 10a to have a content of the fluorine-containing oil in the range of 5% by weight to 15% by weight. In the case of less than 5% by weight, the lubricating property becomes too low, with the result that the floating stability and the travelling stability of the optical head become relatively low. In the case of more than 15% by weight, the adhering property of the optical head to the disk surface becomes too high, with the result that the floating stability of the optical head become relative low and that it becomes difficult to separate the optical head from the magneto-optical disk when the magneto-optical disk is taken out of the recording/reproduction apparatus.

Figure 6:
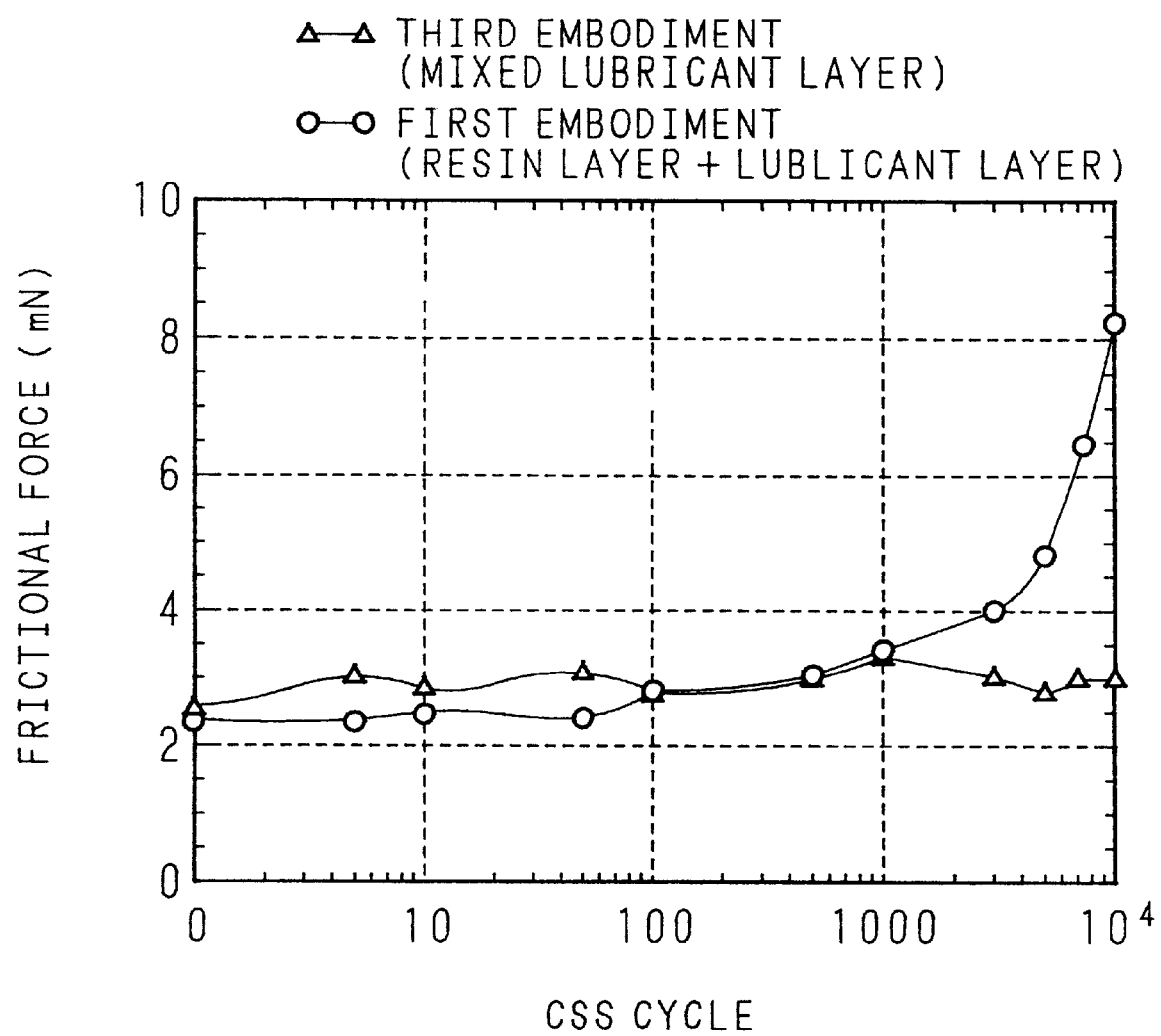
FIG. 6 is a graph that shows the frictional force (CSS test) of an optical head with respect to the magneto-optical disk of embodiment 3.

A magneto-optical disk 3 having the above-mentioned construction was formed by mixing the transparent/translucent fluorine-containing oil and the transparent/translucent acrylic resin at a ratio of 10% by weight to 90% by weight in the transparent/translucent mixed lubricating layer 10a. With respect to this magneto-optical disk 3, changes in frictional force between the transparent/translucent mixed lubricating layer 10a and the optical head 7 were measured by carrying out the Contact Start and Stop (CSS) test and sliding tests. FIG. 6 is a graph showing the results of the CSS test in which the axis of abscissa represents the CSS cycle and the axis of ordinate represents the frictional force between the optical head 7 and the transparent/translucent mixed lubricating layer 10a. The CSS test refers to a test in which frictional forces at the time of rotation start and at the time of stoppage of the magneto-optical disk 3 are measured in each cycle. In addition to the magnet-optical disk 3, the same measurements were made on the magneto-optical disk 1 of embodiment 1 having two layers of the transparent/translucent resin layer and the transparent/translucent lubricant layer formed on a side closer to the substrate, and the results are shown in a graph. In the graph, the results of embodiment 3 are shown by "Δ", and the results of embodiment 1 are shown by "○".

Figure 7:
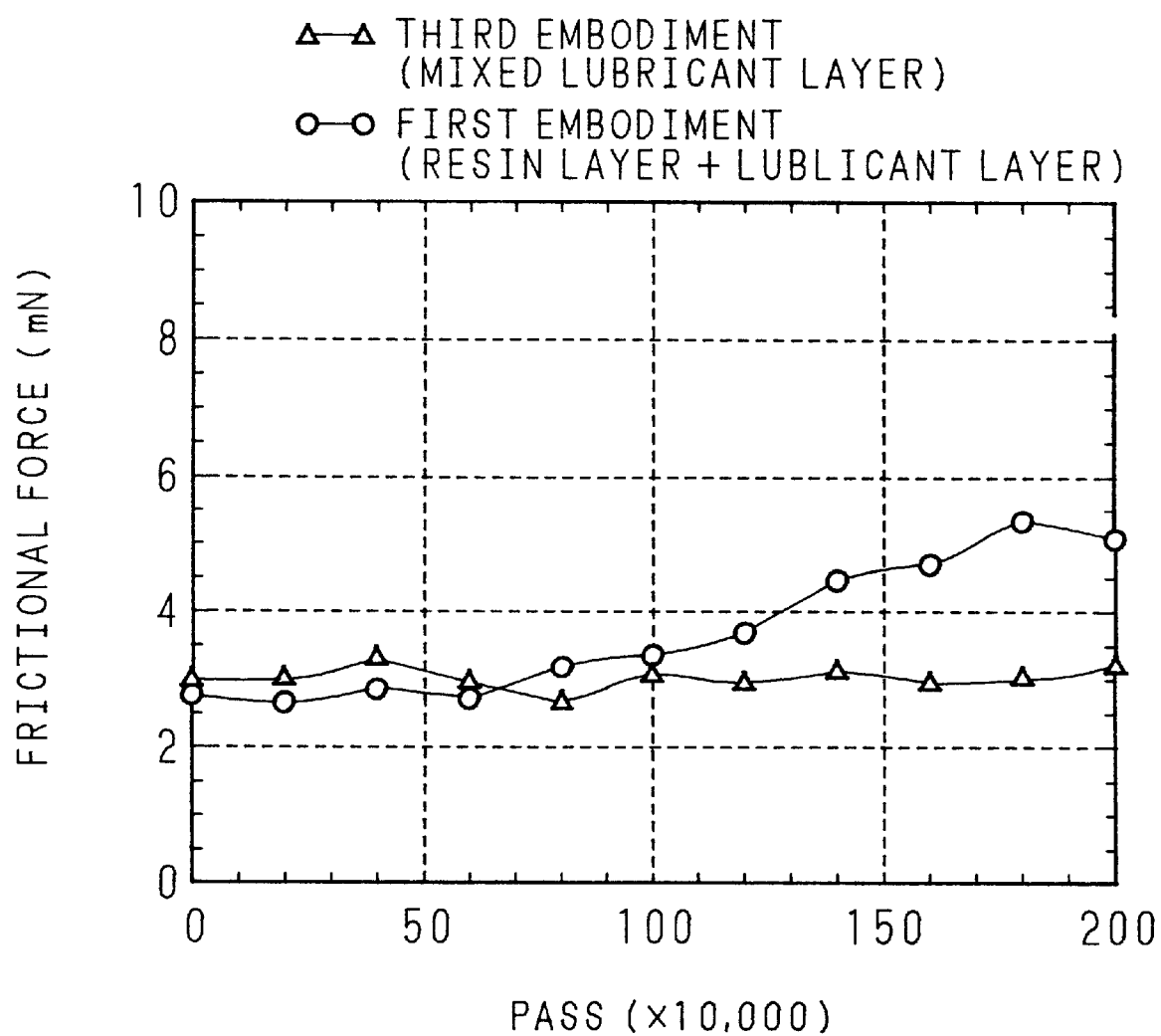
FIG. 7 is a graph that shows the frictional force (sliding test) of the optical head with respect to the magneto-optical disk of embodiment 3.

FIG. 7 is a graph showing the results of the sliding test, in which the axis of abscissa represents the number of passes and the axis of ordinate represents the frictional force between the optical head 7 and the transparent/translucent mixed lubricating layer 10a. In the sliding test, the slider was allowed to slide by rotating the magneto-optical disk 3 at a low rotation speed so as not to allow the slider to float, and the frictional force was measured for each rotation. In addition to the magneto-optical disk 3, the same measurements were made on the magneto-optical disk 1 of embodiment 1 having two layers of the transparent/translucent resin layer and the transparent/translucent lubricant layer formed on a side closer to the substrate, and the results are shown in a graph. In the graph, the results of embodiment 3 are shown by "Δ", and the results of embodiment 1 are shown by "○".

As clearly shown by FIG. 6, in the case of CSS cycles of not less than 1000, a great difference was observed in the frictional force between embodiment 1 and embodiment 3; and it is found that as compared with embodiment 1, embodiment 3 provides a constant frictional force even in the case of CSS cycles of not less than 1000. Moreover, as shown by FIG. 7, in the case of the number of passes of not less than 100×10000, a difference was also observed in the frictional force, and it is found that as compared with embodiment 1, embodiment 3 provides a constant frictional force even in the case of the number of passes of not less than 100×10000. Therefore, as compared with the magneto-optical disk 1 of embodiment 1 having the transparent/translucent resin layer and the transparent/translucent lubricant layer, the magneto-optical disk 3 of embodiment 3 having the transparent/translucent resin layer containing a lubricant provides a higher retaining property in the floating stability and the travelling stability of the optical head 7. Here, since the CSS cycles of 1000 or the number of passes of 100×10000 are excessive numbers, even the magneto-optical disk of embodiment 1 has a sufficient retaining property in the floating stability and the travelling stability for practical use.

Additionally, embodiment 3 has exemplified a case in which acrylic resin and fluorine-containing oil are mixed to form the transparent/translucent mixed lubricating layer 10a; however, the present invention is not intended to be limited thereby, and a stabilizing material for suppressing a phase separation between the parent material resin and the liquid lubricating material may be added thereto.

Embodiment 4

Figure 8:
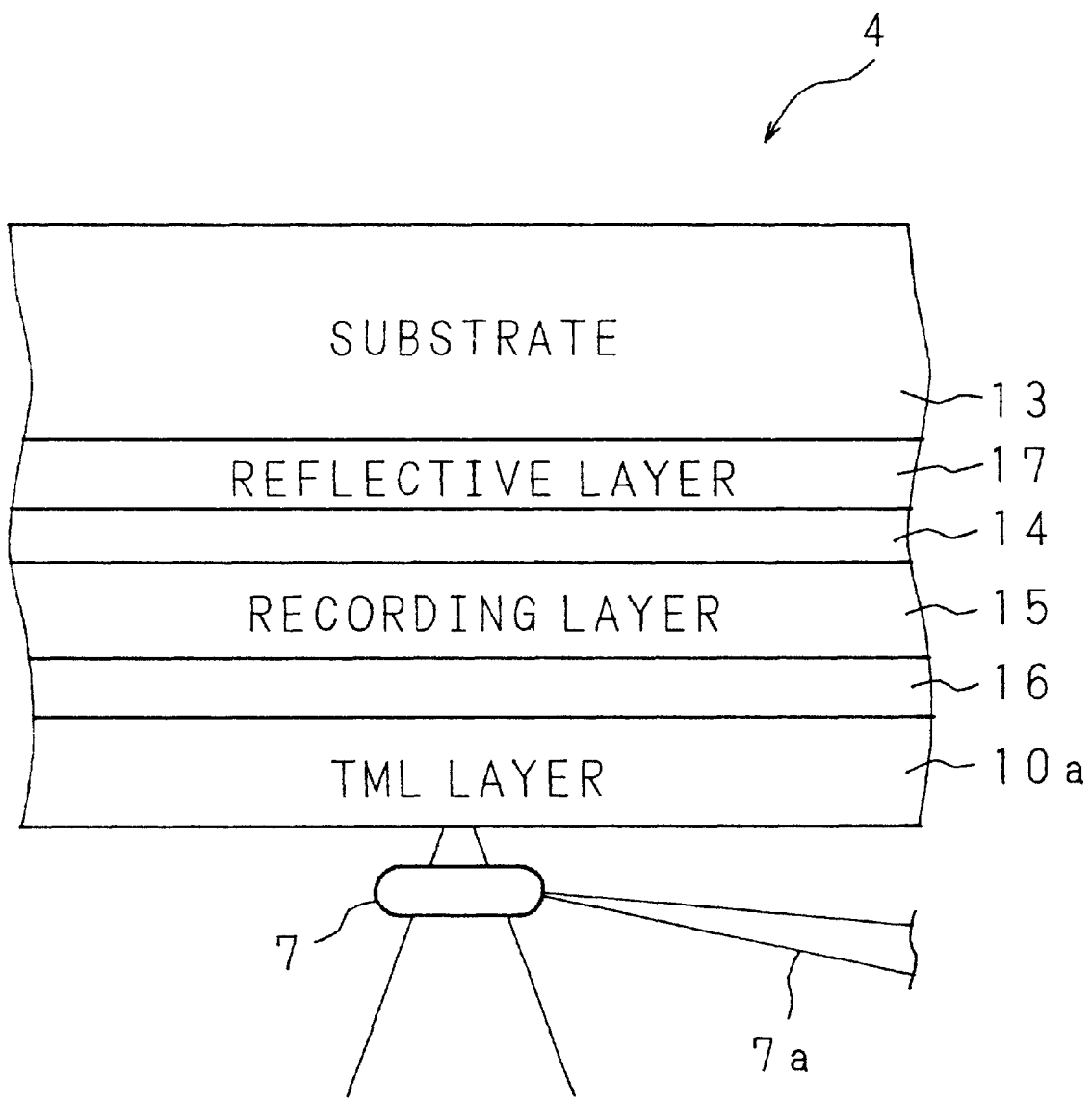
FIG. 8 is a cross-sectional view that shows a film construction of a magneto-optical disk in accordance with embodiment 4.

FIG. 8 is a cross-sectional view showing a film construction of a magneto-optical disk in accordance with embodiment 4. This magneto-optical disk 4 is of a type in which a laser light beam is made incident on a side closer to the recording layer 15, while a magnetic field is applied thereto. As illustrated in FIG. 8, on a substrate 13 are stacked a reflective layer 17, a first dielectric protective layer 14, a recording layer 15 and a second dielectric protective layer 16, and on the second dielectric protective layer 16 is stacked a transparent/translucent mixed lubricating layer 10a. The other constructions, the materials of the respective layers and the manufacturing method are the same as those described in embodiment 3; therefore, the description thereof is omitted.

With respect to the magneto-optical disk 4 having the above-mentioned construction, the same measurements as described above were carried out so as to evaluate the floating stability and the travelling stability of the optical head 7, and the same results as embodiment 3 were obtained. Therefore, it is proved that the magneto-optical disk 4 of embodiment 4, in which the transparent/translucent mixed lubricating layer 10a, is formed on the recording layer 15 side that is the laser-light-beam incident side, makes it possible to improve the floating stability and the travelling stability of the optical head 7, and consequently to provide the same effects as embodiment 3.

Embodiments 1 through 4 have exemplified cases in which a transparent/translucent resin is used as the lubricating protective layer. The transparent/translucent resin is placed so as to protect the substrate made of resin from scratches; therefore, for example, in the case of the application of a substrate made of glass, the same effects can be obtained even if only a transparent/translucent lubricant is used. The following description will discuss such a magneto-optical disk.

Embodiment 5

Figure 9:
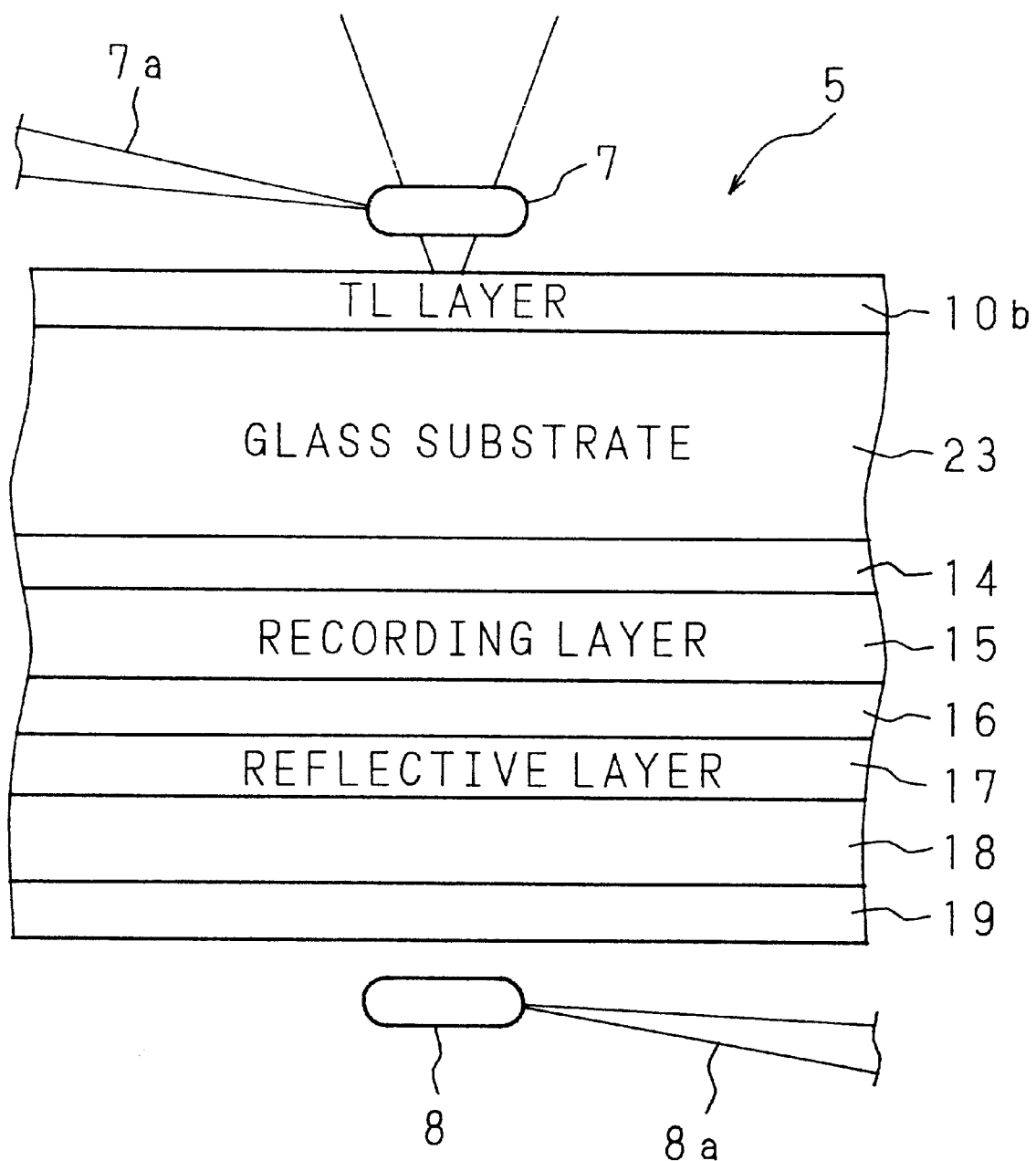
FIG. 9 is a cross-sectional view that shows a film construction of a magneto-optical disk in accordance with embodiment 5.

FIG. 9 is a cross-sectional view showing a film construction of a magneto-optical disk in accordance with embodiment 5. This magneto-optical disk 5 is of a type in which a laser light beam is made incident on a side closer to the substrate, while a magnetic field is applied on a side closer to the recording layer, that is, on a side opposite to the substrate 23. As illustrated in FIG. 9, a substrate 23 made of glass is provided with a transparent/translucent lubricant layer 10b on the surface opposite to the recording layer 15. The transparent/translucent lubricant layer 10b is formed by applying transparent/translucent fluorine-containing oil onto the substrate 23 by spin coating or spray coating and then drying this. The other constructions, the materials of the respective layers and the manufacturing method are the same as those described in embodiment 1; therefore, the description thereof is omitted. Here, the transparent/translucent lubricant layer 10b may be formed by applying transparent/translucent silicone oil or transparent/translucent hydrocarbon oil.

With respect to the magneto-optical disk 5 having the above-mentioned construction, the same measurements as embodiment 1 were carried out so as to evaluate the floating stability and the travelling stability of the optical head 7, and the same results were obtained. Therefore, it is proved that the magneto-optical disk 5 of embodiment 5, in which the substrate 23 made of glass is provided, makes it possible to protect the substrate 23 by forming only one layer, that is, the transparent/translucent lubricant layer 10b, as a lubricating protective layer, and consequently to provide superior floating stability and travelling stability in the optical head 7.

Embodiment 6

Figure 10:
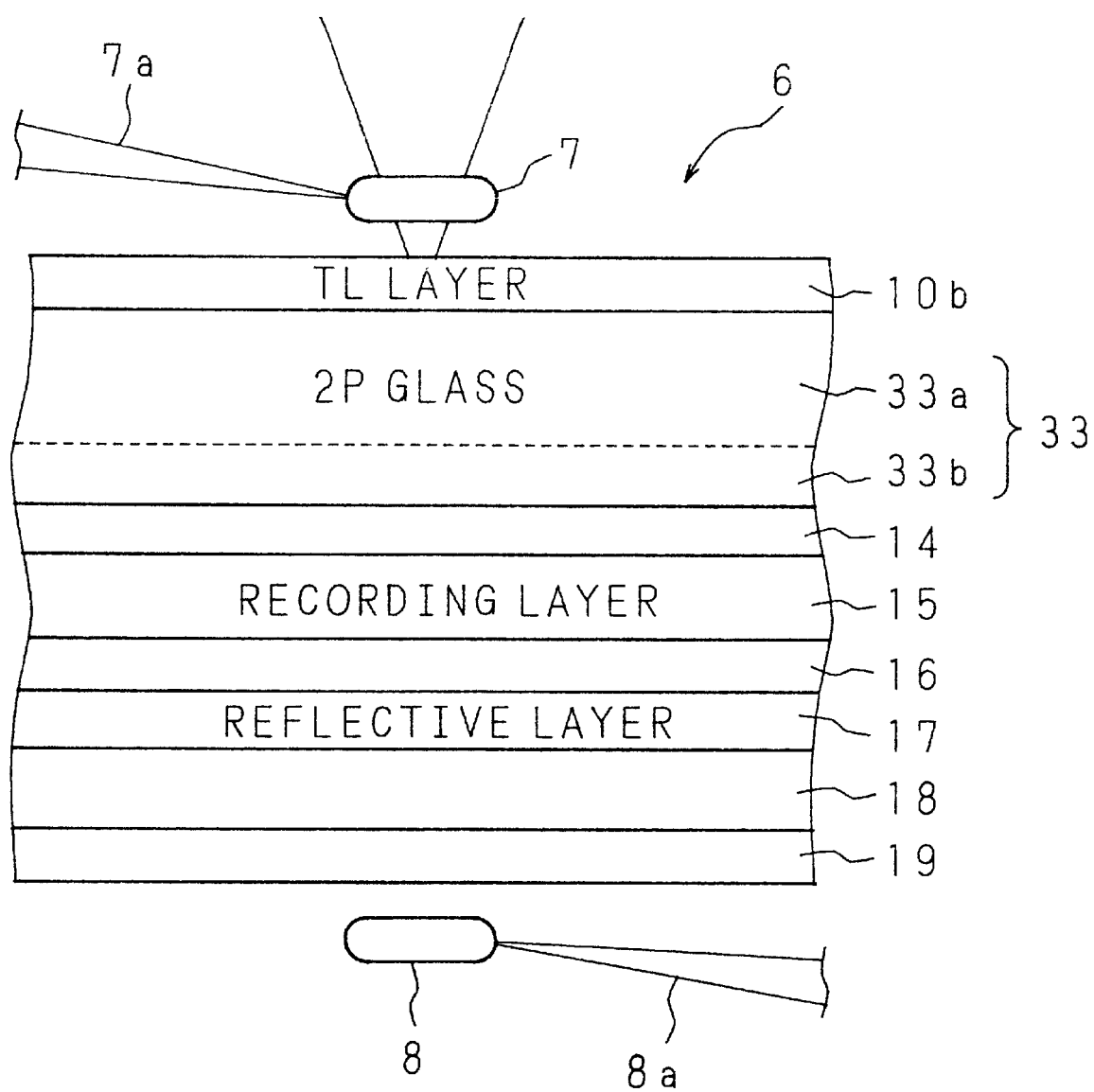
FIG. 10 is a cross-sectional view that shows a film construction of a magneto-optical disk in accordance with embodiment 6.

FIG. 10 is a cross-sectional view showing a film construction of a magneto-optical disk in accordance with embodiment 6. This magneto-optical disk 6 is of a type in which a laser light beam is made incident on a side closer to the substrate, while a magnetic field is applied on a side closer to the recording layer, that is, on a side opposite to the substrate 33. As illustrated in FIG. 10, a substrate 33 made of 2P glass is a substrate in which lands and grooves are formed on a photo-polymer layer 33b on a glass plate section 33a. Here, in the Figure, protruding and recessed sections made by the lands and grooves are omitted and not shown. The substrate 33 made of 2P glass is provided with a first dielectric protective layer 14, a recording layer 15, a second dielectric protective layer 16, a reflective layer 17, a resin layer 18 and a lubricant layer 19, on its surface having the lands and grooves, and a transparent/translucent lubricant layer 10b is formed on its surface opposite to the recording layer 15. The other constructions, the materials of the respective layers and the manufacturing method are the same as those of embodiment 5; therefore, the description thereof is omitted.

With respect to the magneto-optical disk 6 having the above-mentioned construction, the same measurements as embodiment 5 were carried out so as to evaluate the floating stability and the travelling stability of the optical head 7, and the same results were obtained. Therefore, it is proved that the magneto-optical disk 6 of embodiment 6, in which the glass plate section 33a is provided on the surface of the substrate 33 opposing the optical head 7, makes it possible to protect the substrate 33 by forming only one layer, that is, the transparent/translucent lubricant layer 10b, as a lubricating protective layer, and consequently to provide superior floating stability and travelling stability in the optical head 7.

Embodiment 7

Figure 11:
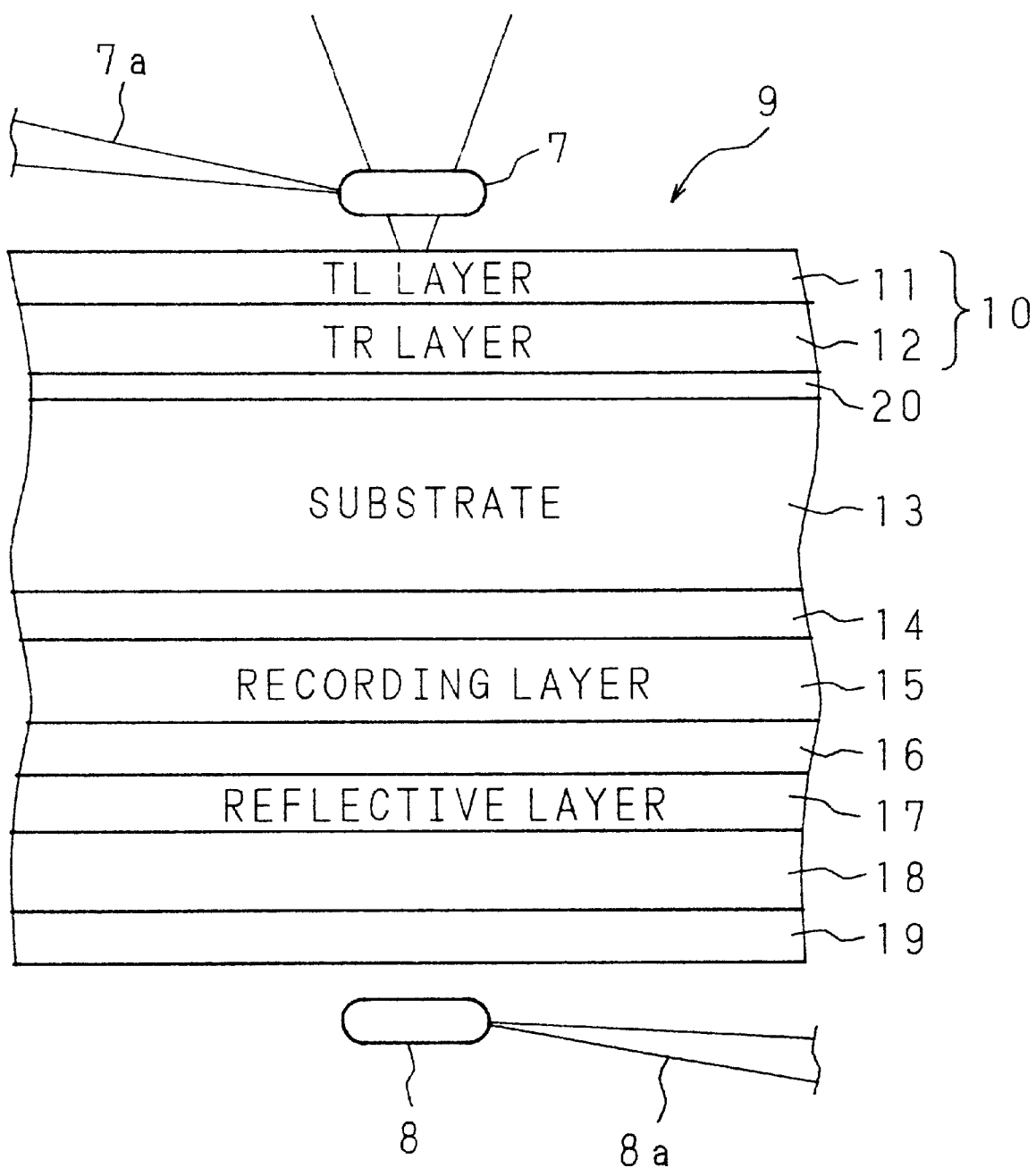
FIG. 11 is a cross-sectional view that shows a film construction of a magneto-optical disk in accordance with embodiment 7.

FIG. 11 is a cross-sectional view showing a film construction of a magneto-optical disk in accordance with embodiment 7. This magneto-optical disk 9 is of a type in which a laser light beam is made incident on a side closer to the substrate, while a magnetic field is applied on a side closer to the recording layer, that is, on a side opposite to the substrate 13. As illustrated in FIG. 11, a substrate 13 made of polycarbonate is provided with a buffer layer 20 made of a transparent/translucent dielectric, a transparent/translucent resin layer 12, and a transparent/translucent lubricant layer 11 that are stacked in this order on its surface opposite to the recording layer 15. The buffer layer 20 is a transparent/translucent dielectric made of an oxide or a nitride. The other constructions, the materials of the respective layers and the manufacturing method are the same as those of embodiment 1; therefore, the description thereof is omitted.

The magneto-optical disk 9 having the above-mentioned construction provides the same effects as those of embodiment 1. Moreover, for example in the case of the substrate 13 made of polycarbonate or polyolefin with a thickness of not more than 0.6 mm, the formation of the buffer layer 20 makes it possible to prevent tilting, warping, etc. of the substrate 13 due to thermal expansion or moisture absorption of the substrate 13.

Additionally, embodiment 7 exemplified a case in which the transparent/translucent resin layer 12 is formed on the buffer layer 20 with the transparent/translucent lubricant layer 11 formed on the transparent/translucent resin layer 12; however, the present invention is not intended to be limited by this, and the same effects can be obtained in the case when the transparent/translucent lubricating layer 11 is directly applied onto the buffer layer 20. Moreover, a transparent/translucent mixed lubricating layer 10a (see embodiment 4), formed by mixing a transparent/translucent lubricant with a transparent/translucent resin, may be formed on the buffer layer 20. In the case when fluorine-containing oil, silicone oil or hydrocarbon oil is used as the transparent/translucent lubricant, sine these oils have a superior chemical adsorptive property to acrylic resin or glass as described earlier, the application of one of these onto the buffer layer 20 makes it possible to highly enhance the lubricating durability of the transparent/translucent lubricant layer 11.

Embodiment 8

Figure 12:
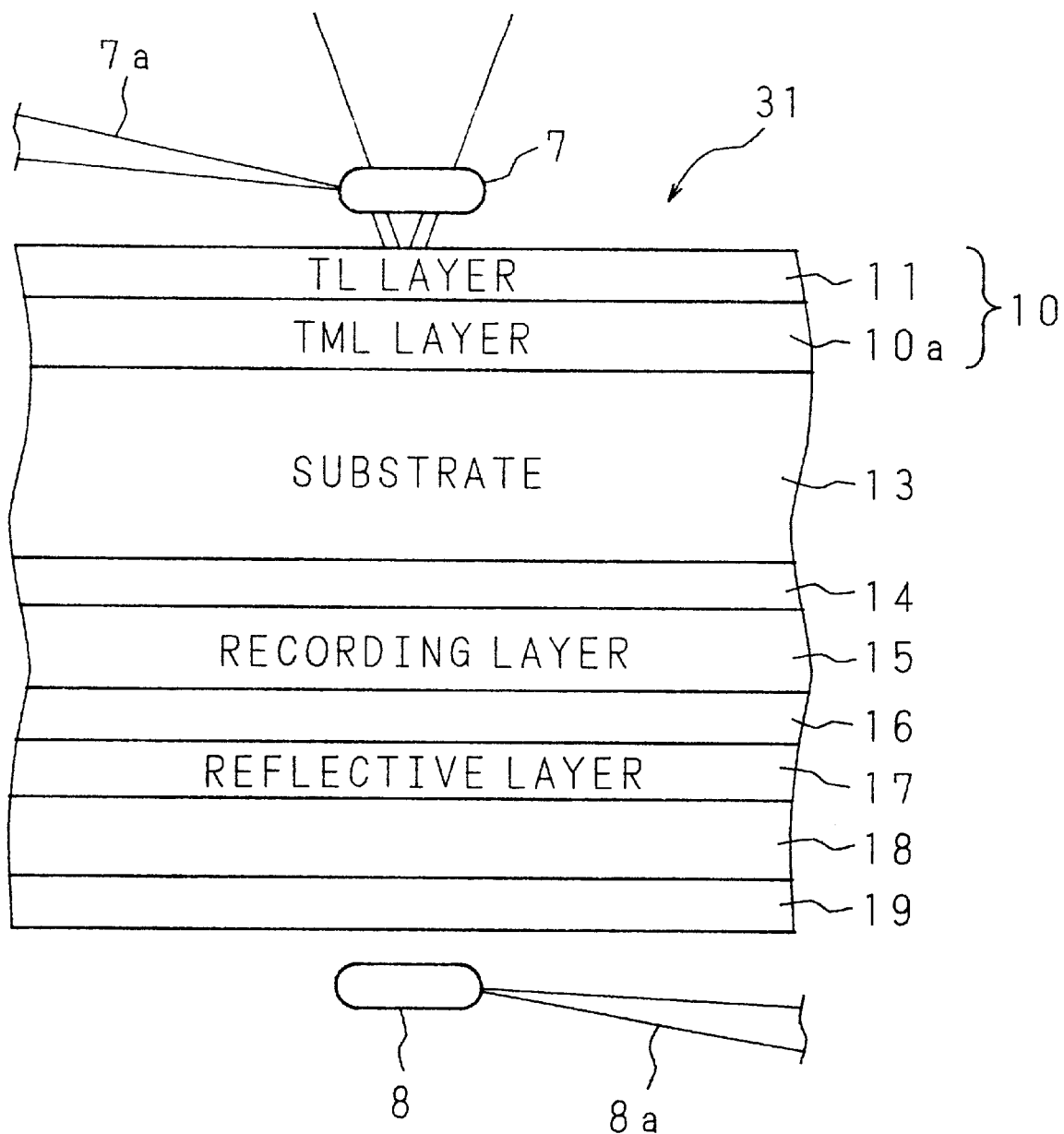
FIG. 12 is a cross-sectional view that shows a film construction of a magneto-optical disk in accordance with embodiment 8 of the present invention.

FIG. 12 is a cross-sectional view showing a film construction of a magneto-optical disk in accordance with embodiment 8. This magneto-optical disk 31 is of a type in which a laser light beam is made incident on a side closer to the substrate, while a magnetic field is applied on a side closer to the recording layer, that is, on a side opposite to the substrate 13. As illustrated in FIG. 12, a substrate 13 is provided with a lubricating protective layer 10 constituted by a transparent/translucent mixed lubricating layer 10a and a transparent/translucent lubricant layer 11, which is formed on its surface opposite to the recording layer 15, and the transparent/translucent lubricant layer 11 is formed as the outermost layer.

The transparent/translucent mixed lubricating layer 10a is formed as follows: A transparent/translucent acrylic resin and transparent/translucent fluorine-containing oil are mixed at a ratio of 90% by weight to 10% by weight, and this is applied onto the substrate 13, and then ultraviolet-set. Here, the range of the mixing ratio of the acrylic resin and the fluorine-containing oil is set in the same manner as embodiment 3. The transparent/translucent lubricant layer 11 is formed by applying fluorine-containing oil by spin coating or spray coating, and then drying this. The other constructions, the materials of the respective layers and the manufacturing method are the same as those of embodiment 1 and embodiment 3; therefore, the description thereof is omitted.

Figure 13:
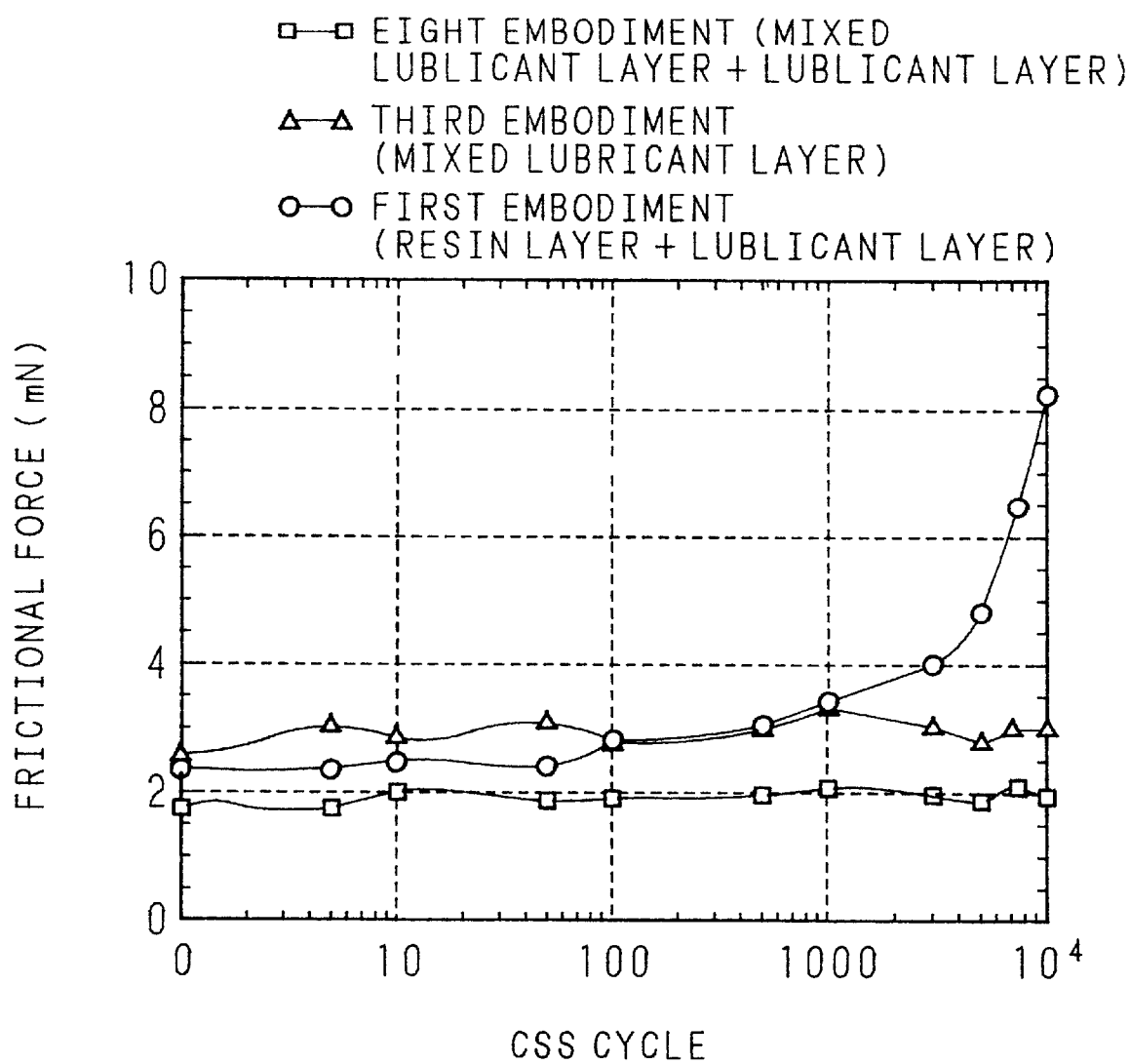
FIG. 13 is a graph that shows the frictional force (CSS test) of an optical head with respect to the magneto-optical disk of embodiment 8.

With respect to the magneto-optical disk 31 having the above-mentioned construction, changes in the frictional force between the transparent/translucent lubricant layer 11 and the optical head 7 were measured by carrying out the CSS test and sliding test. FIG. 13 is a graph showing the results of the CSS test, in which the axis of abscissa represents the CSS cycle and the axis of ordinate represents the frictional force between the optical head 7 and the transparent/translucent lubricant layer 11. In addition to the magneto-optical disk 31, the same measurements were carried out on the magneto-optical disk 3 of embodiment 3 having only the transparent/translucent mixed lubricating layer 10a on a side closer to the substrate and the magneto-optical disk 1 of embodiment 1 having two layers of the transparent/translucent resin layer and the transparent/translucent lubricant layer, and these results are also shown in the graph. In the graph, "□" represents the results of the present embodiment 8, "Δ" represents those of embodiment 3 and "○" represents those of embodiment 1.

Figure 14:
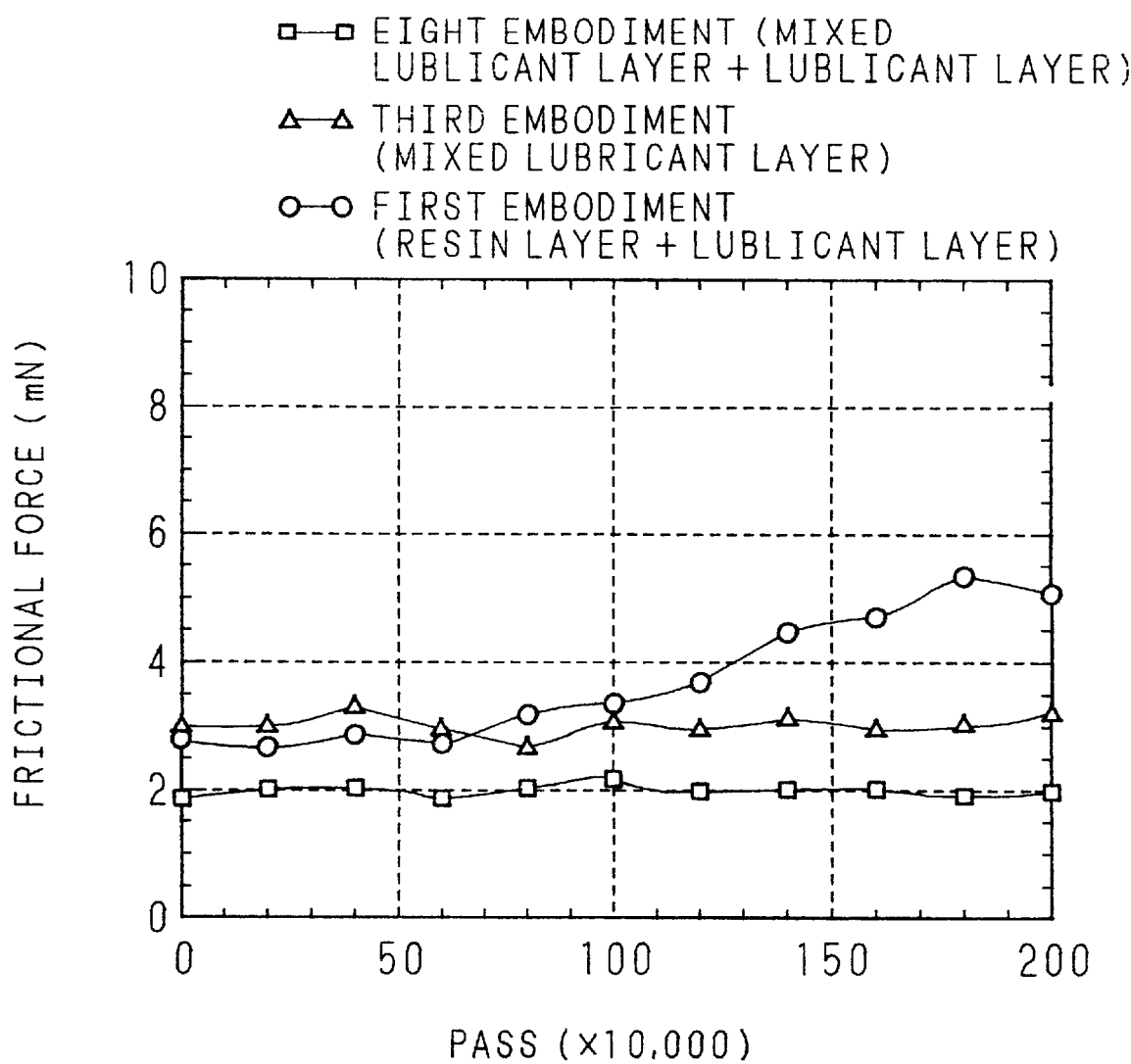
FIG. 14 is a graph that shows the frictional force (sliding test) of the optical head with respect to the magneto-optical disk of embodiment 8.

FIG. 14 is a graph showing the results of the sliding test, in which the axis of abscissa represents the number of passes and the axis of ordinate represents the frictional force between the optical head 7 and the transparent/translucent lubricating layer 11. In the sliding test, the slider was allowed to slide by rotating the magneto-optical disk 31 at a low rotation speed so as not to allow the slider to float, and the frictional force was measured for each rotation. In addition to the magneto-optical disk 31, the same measurements were made on the magneto-optical disks of embodiment 1 and embodiment 3, and the results are shown in a graph. In the graph, the results of embodiment 8 are shown by "□", the results of embodiment 3 are shown by "Δ", and the results of embodiment 1 are shown by "○".

As shown by FIG. 13 and FIG. 14, in both of the CSS test and the sliding test, embodiment 8 provides a smaller frictional force as compared with embodiment 3. Therefore, it is confirmed that the magneto-optical disk 31 of embodiment 8 having the transparent/translucent lubricating layer 11 formed on the transparent/translucent mixed lubricating layer 10a provides higher floating stability and travelling stability of the optical head 7 than the magneto-optical disk 3 having only the transparent/translucent mixed lubricating layer 10a formed thereon.

Here, embodiment 8 exemplified a case in which an acrylic resin and fluorine-containing oil were mixed so as to form the transparent/translucent mixed lubricating layer 10a; however, the present invention is not limited by this combination. Moreover, a stabilizing material for suppressing a phase separation between the parent material resin and the liquid lubricating material may be further added thereto. Furthermore, with respect to the transparent/translucent lubricant layer 11, it is preferable to use the same kind of lubricant as used for the transparent/translucent mixed lubricating layer 10a; and for example, in the case when silicone oil is used for the transparent/translucent mixed lubricating layer 10a, it is preferable to also use the silicone oil for the transparent/translucent lubricant layer 11.

Embodiment 9

Figure 15:
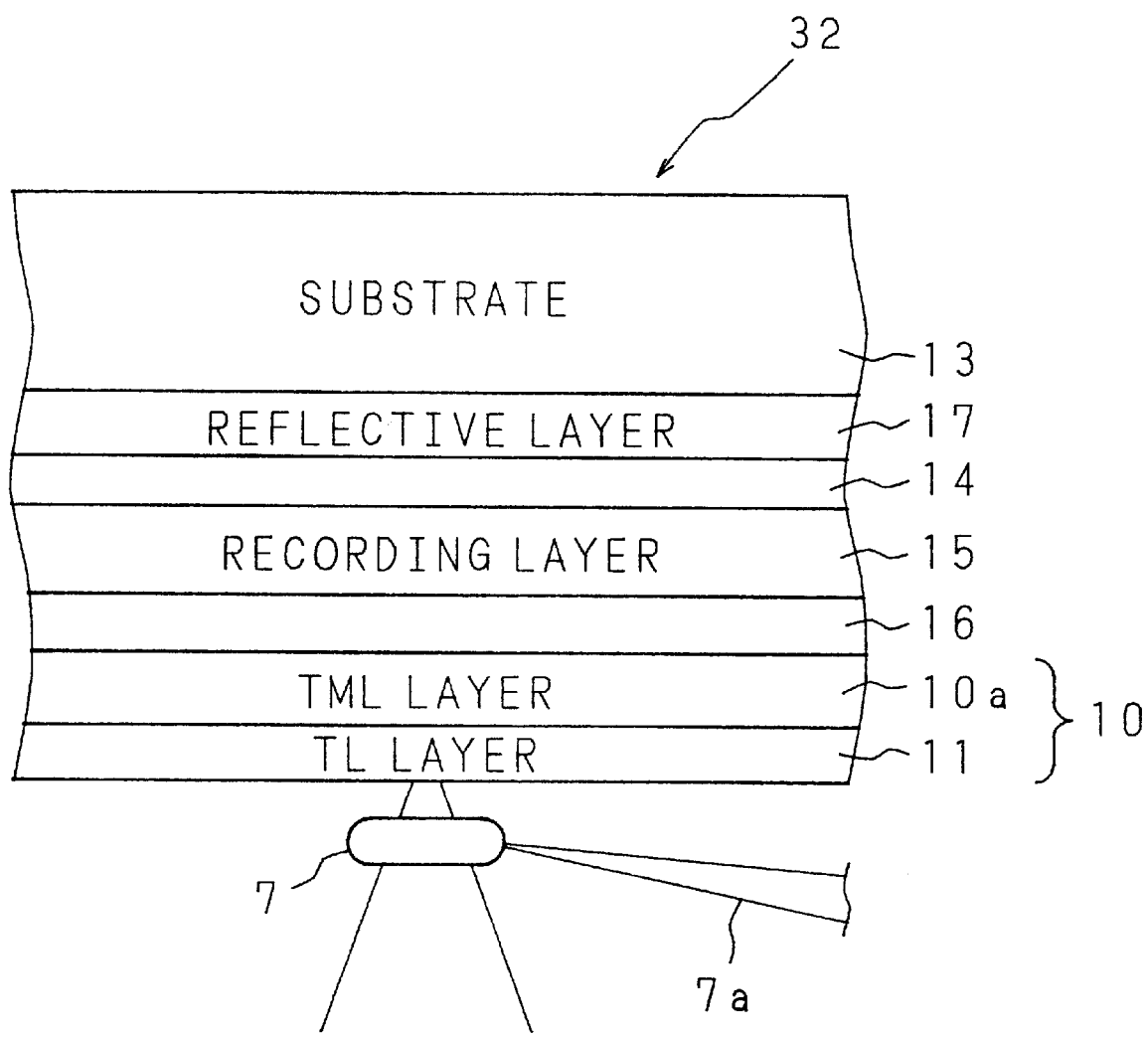
FIG. 15 is a cross-sectional view that shows a film construction of a magneto-optical disk in accordance with embodiment 9.

FIG. 15 is a cross-sectional view showing a film construction of a magneto-optical disk in accordance with embodiment 9. This magneto-optical disk 32 is of a type in which a laser light beam is made incident on a side closer to the recording layer, while a magnetic field is applied thereto. As illustrated in the Figure, on a substrate 13 are stacked a reflective layer 17, a first dielectric protective layer 14, a recording layer 15 and a second dielectric protective layer 16, and on the second dielectric protective layer 16 is stacked a lubricating protective layer 10 constituted by a transparent/translucent mixed lubricating layer 10a and a transparent/translucent lubricant layer 11. The transparent/translucent lubricant layer 11 is provided as the outermost layer of the magneto-optical disk 32. The materials of the respective layers and the manufacturing method are the same as those described in embodiment 8; therefore, the description thereof is omitted.

With respect to the magneto-optical disk 32 having the above-mentioned construction, the same measurements as described above were carried out so as to evaluate the floating stability and the travelling stability of the optical head 7, and the same results as embodiment 8 were obtained. Therefore, it is proved that the magneto-optical disk 32 of embodiment 9, in which a lubricating protective layer 10 constituted by a transparent/translucent mixed lubricating layer 10a and a transparent/translucent lubricant layer 11, is formed on the recording layer 15 that is the laser-light-beam incident side, makes it possible to improve the floating stability and the travelling stability of the optical head 7, and consequently to provide the same effects as embodiment 8.

Embodiment 10

In the above-mentioned embodiments, the optical head 7 has a construction in which an optical lens is attached to a slider made of ceramics such as calcium titanate and aluminum oxide-titanium carbide. Here, the application of a slider that has been shaped with higher precision makes it possible to further improve the floating stability of an optical head. The following description will discuss such an optical head.

Figure 16:
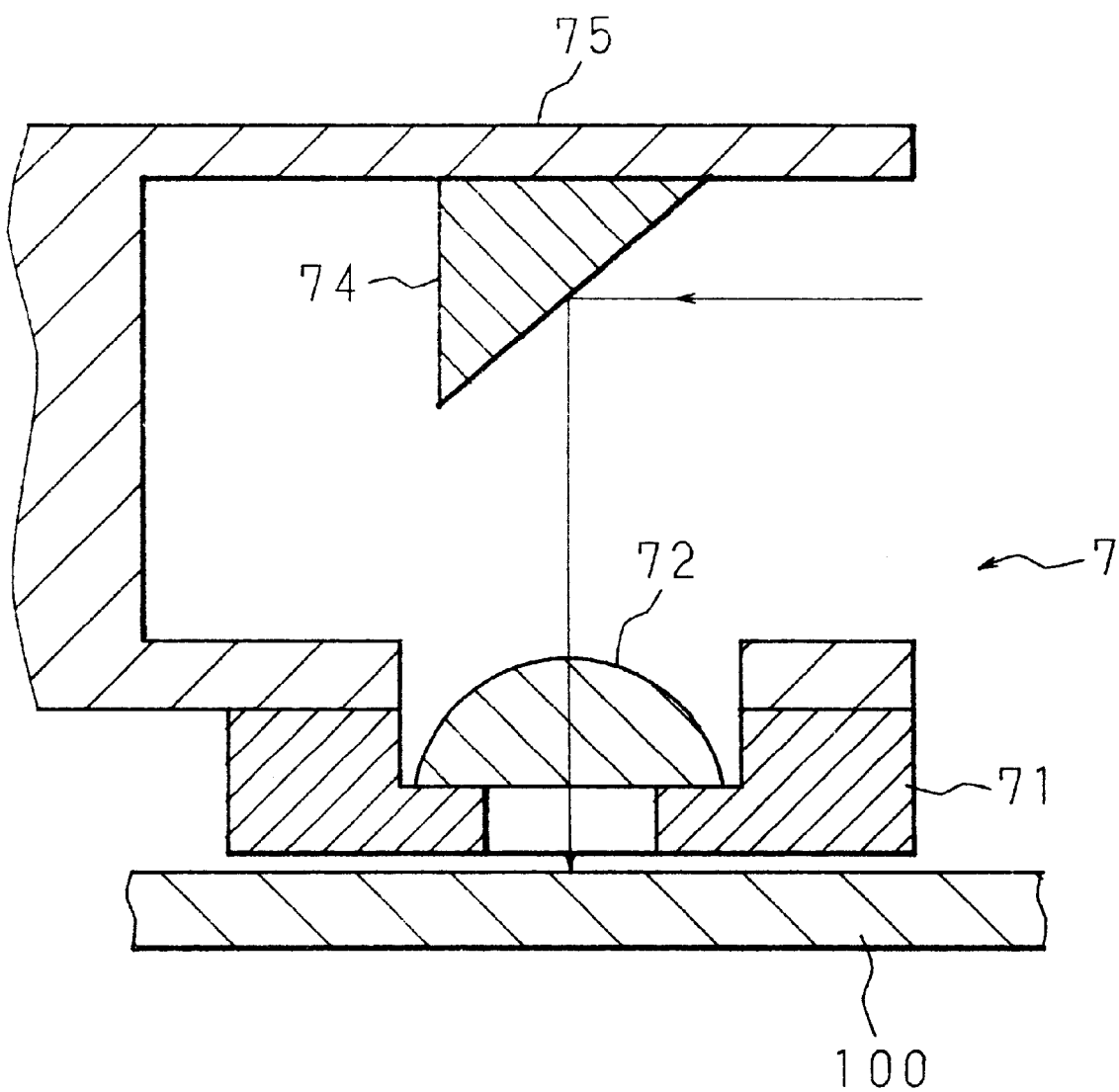
FIG. 16 is a schematic cross-sectional view that shows an essential part of an optical head device in accordance with the present invention.

FIG. 16 is a schematic cross-sectional view that shows an essential part of an optical head device in accordance with the present invention. The optical head 7 has a construction in which a slider 71, formed by injection-molding a polymer material containing a liquid crystal polymer, for instance, a thermoplastic resin made of a polyester copolymer having aromatic character, is attached to a supporting member 75 so that the supporting member 75 allows the slider 71 to shift to a predetermined position on a magneto-optical disk 100 by shifting an arm, not shown. The slider 71 has an aperture section through which a laser light beam is allowed to pass, and an optical lens 72 is attached in a manner so as to cover the aperture section. A prism 74 is placed at a position opposing to the optical lens 71 so as to emitted the laser light beam emitted from a laser light source toward the optical lens 72.

The optical head 7 having the above-mentioned construction is located in the proximity of the disk surface at the time of recording/reproducing information on/from the magneto-optical disk 1, and the slider 71 is allowed to float as the disk rotates. Then, the laser light beam, which has been reflected by the prism 74 and converged by the optical lens 72, is made incident thereon so as to carry out information recording/reproducing. In this case, the dimensional precision of the slider 71 gives great effects on the floating stability and the presence or absence of contacting and sliding. In the optical head device of the present embodiment, since the slider 71 is injection-molded by using the liquid crystal polymer, it is shaped into a desired form with high dimensional precision, thereby making it possible to achieve high floating stability of the optical head 7.

In this manner, the application of the optical head device of the present embodiment makes it possible to provide high floating stability. This optical head was allowed to slide on each of the above-mentioned embodiments 1 through 7, the degree of scratches was evaluated. In the sliding test, the slider was allowed to slide by rotating the magneto-optical disk at a low rotation speed so as not to allow the slider to float. In the same manner, a conventional optical hand's slider made of ceramics and a conventional magneto-optical disk having no transparent/translucent lubricating protective layer were also examined. The results are shown in TABLE 2. In the Table, those disks that are not susceptible to scratches are indicated by "○", those that are susceptible to scratches are indicated by "X ", and those that are susceptible to scratches to an intermediate degree are indicated by "Δ".

As clearly shown by TABLE 2, the optical head device of the present invention, when applied to a magneto-optical disk having a transparent/translucent lubricating protective layer, makes it possible to prevent scratches on the optical disk, and consequently to improve the travelling stability.

Here, the above-mentioned embodiments 1 through 8 exemplified cases in which the parent material resin of the transparent/translucent resin layer 12 and the transparent/translucent mixed lubricating layer 10a was an acrylic resin; however, the present invention is not intended to be limited thereby. The applicant of the present application, for example, has proposed Japanese Patent Application Laid-Open No. 4-168636 (1992) in which a joined magneto-optical disk having a protective coating film formed on a substrate. The protective coating film prevents dusts from adhering to the disk surface, and also makes it easier to remove them. With respect to this protective coating film, a phosphazene resin or a copolymerized resin between acrylic acid ester containing fluorocarbon and a 2P resin is listed; and such a resin may be used as the parent material resin of the transparent/translucent resin layer 12 or the transparent/translucent mixed lubricating layer 10a of the above-mentioned embodiments 1 through 7. This makes the disk surface less susceptible to dusts, and also makes it easier to remove them.

Moreover, the above-mentioned embodiments 1, 3, 5 and 7 exemplified cases in which the two layers of the resin layer 18 and the lubricant layer 19 were formed as the lubricating protective layer on the side on which the magnetic head 8 was located; however, the present invention is not intended to be limited thereby, and a lubricant may be mixed with an photo-curing resin, and this may be applied and set so as to form a single lubricating protective layer.

As described above, in the present invention, a lubricating protective layer having a transparent/translucent property is formed on the surface on which the optical head of the magneto-optical recording medium is placed; therefore, it becomes possible to improve the floating stability and the travelling stability of the optical head of a slider type, and consequently to prevent scratches on the surface of the magneto-optical recording medium. Moreover, since the slider is formed by a polymer material containing a liquid crystal polymer, it is shaped into a desired form with high precision, thereby making it possible to provide high floating stability and travelling stability in the optical head. When the optical head of this type is applied to the magneto-optical recording medium of the present invention having the transparent/translucent lubricating protective layer, it becomes possible to achieve higher floating stability and travelling stability; thus, the present invention provides superior effects.

TABLE 1

| Mixing ratio of fluorine-containing oil (Weight %) | Lubricating property | Non-adhering property between slider and disk surface |
| --- | --- | --- |
| 0 | X | ○ |
| 1 | Δ | ○ |
| 5 | ○ | ○ |
| 10 | ○ | ○ |
| 15 | ○ | ○ |
| 20 | ○ | Δ |
| 25 | ○ | Δ~X |
| 30 | ○ | X |
| 50 | ○ | X |

TABLE 2

| Sliding test | With lubricating protective layer (Embodiments 1 through 7) | No lubricating protective layer (Prior art) |
| --- | --- | --- |
| Liquid crystal polymer slider (Embodiment 8) | ○ | Δ |
| Ceramics slider (Prior art) | Δ | X |

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magneto-optical recording medium comprising:

a substrate;

a recording layer, formed on the substrate, for recording information;

a first lubricating protective layer formed on the recording layer; and a second lubricating protective layer that passes enough light to allow operation of a laser light beam that is used for information recording and/or reproducing on and/or from the medium, the second lubricating protective layer being formed on a face of the substrate opposite to the recording layer;

wherein the second lubricating protective layer includes a lubricant that passes enough light to allow operation of the laser light beam that is used for information recording and/or reproducing on and/or from the medium and a resin that passes enough light to allow operation of the laser light beam that is used for information recording and/or reproducing on and/or from the medium.

2. A magneto-optical recording medium comprising:

a substrate;

a recording layer, formed on the substrate, for recording information; and a lubricating protective layer that passes enough light to allow operation of a laser light beam that is used for information recording and/or reproducing on and/or from the medium, being formed on the recording layer;

wherein the lubricating protective layer includes a lubricant that passes enough light to allow operation of a laser light beam that is used for information recording and/or reproducing on and/or from the medium and a resin that passes enough light to allow operation of a laser light beam that is used for information recording and/or reproducing on and/or from the medium.

3. The magneto-optical recording medium according to claim 1, wherein the second lubricating protective layer is made by mixing said lubricant with said resin.

4. The magneto-optical recording medium according to claim 1, wherein the second lubricating protective layer includes a resin layer made of said resin, and a lubricant layer that is made of said lubricant, and provided as an outermost layer of the recording medium.

5. The magneto-optical recording medium according to claim 1, wherein the second lubricating protective layer is made by mixing said lubricant with said resin, and a lubricant layer that is made of a lubricant that passes enough light to allow operation of a laser light beam that is used for information recording and/or reproducing on and/or from the medium and provided as an outermost layer of the recording medium.

6. The magneto-optical recording medium according to claim 1, wherein the substrate has at least one portion made of glass, and the second lubricating protective layer is formed by allowing the lubricant to contact the glass of the substrate.

7. The magneto-optical recording medium according to claim 1 further comprising:

a buffer layer being made of a dielectric that passes enough light to allow operation of a laser light beam that is used for information recording and/or reproducing on and/or from the medium, the buffer layer being formed between the substrate and the second lubricating protective layer.

8. The magneto-optical recording medium according to claim 2, wherein the lubricating protective layer is a mixed lubricating layer made by mixing said lubricant with said resin.

9. The magneto-optical recording medium according to claim 2, wherein the lubricating protective layer includes a resin layer made of said resin, and a lubricant layer that is made of said lubricant and provided as an outermost layer of the recording medium.

10. The magneto-optical recording medium according to claim 2, wherein the lubricating protective layer is made by mixing said lubricant with said resin, and a lubricant layer that is made of a lubricant that passes enough light to allow operation of a laser light beam that is used for information recording and/or reproducing on and/or from the medium and provided as an outermost layer of the recording medium.

11. The magneto-optical recording medium according to claim 3, wherein the lubricant accounts for 5% by weight to 15% by weight of the second lubricating protective layer.

12. The magneto-optical recording medium according to claim 3, wherein the lubricant is formed by using oil selected from the group consisting of fluorine-containing oil, silicone oil and hydrocarbon oil.

13. The magneto-optical recording medium according to claim 5, wherein the lubricant accounts for 5% by weight to 15% by weight of the mixed second lubricating protective layer.

14. The magneto-optical recording medium according to claim 5, wherein the lubricant is formed by using oil selected from the group consisting of fluorine-containing oil, silicone oil and hydrocarbon oil.

15. The magneto-optical recording medium according to claim 8, wherein the lubricant accounts for 5% by weight to 15% by weight of the lubricating protective layer.

16. The magneto-optical recording medium according to claim 8, wherein the lubricant is formed by using oil selected from the group consisting of fluorine-containing oil, silicone oil and hydrocarbon oil.

17. The magneto-optical recording medium according to claim 10, wherein the lubricant accounts for 5% by weight to 15% by weight of the mixed lubricating protective layer.

18. The magneto-optical recording medium according to claim 10, wherein the lubricant is formed by using oil selected from the group consisting of fluorine-containing oil, silicone oil and hydrocarbon oil.

* * * * *